United States Patent
Takahashi

(10) Patent No.: US 10,428,906 B2
(45) Date of Patent: Oct. 1, 2019

(54) TRANSMISSION MECHANISM

(71) Applicant: SUZUKI MOTOR CORPORATION, Hamamatsu-Shi, Shizuoka (JP)

(72) Inventor: Hideaki Takahashi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 324 days.

(21) Appl. No.: 15/411,146

(22) Filed: Jan. 20, 2017

(65) Prior Publication Data

US 2017/0227094 A1    Aug. 10, 2017

(30) Foreign Application Priority Data

Feb. 9, 2016 (JP) ................. 2016-022652

(51) Int. Cl.

| | |
|---|---|
| *F16H 3/08* | (2006.01) |
| *F16H 3/30* | (2006.01) |
| *B62M 11/06* | (2006.01) |
| *F16H 63/18* | (2006.01) |
| *F16H 3/089* | (2006.01) |
| *F16H 63/30* | (2006.01) |

(52) U.S. Cl.
CPC ............... *F16H 3/30* (2013.01); *B62M 11/06* (2013.01); *F16H 3/089* (2013.01); *F16H 63/18* (2013.01); *B60Y 2200/12* (2013.01); *F16H 2063/3093* (2013.01); *F16H 2200/006* (2013.01)

(58) Field of Classification Search
CPC .............................. F16H 3/08; F16H 2200/006
USPC .......................................................... 74/325
See application file for complete search history.

(56) References Cited

U.S. PATENT DOCUMENTS

| | | | |
|---|---|---|---|
| 4,719,819 A | 1/1988 | Tsutsumikoshi et al. | |
| 8,151,662 B2 * | 4/2012 | Fitzgerald | F16H 3/006 74/330 |
| 8,733,194 B2 * | 5/2014 | Mellet | F16H 3/006 74/331 |
| 8,857,284 B2 * | 10/2014 | Kahl | F16H 3/006 74/330 |

(Continued)

FOREIGN PATENT DOCUMENTS

| | | |
|---|---|---|
| DE | 102008001398 A1 | 10/2009 |
| JP | S61189347 A | 8/1986 |
| JP | 2005127392 A | 5/2005 |

OTHER PUBLICATIONS

German Office Action issued for corresponding Application No. 102017102517.0 dated Nov. 22, 2018.

*Primary Examiner* — Ha Dinh Ho

(74) *Attorney, Agent, or Firm* — Troutman Sanders LLP

(57) ABSTRACT

A transmission mechanism includes a plurality of drive gears disposed on a counter shaft and a plurality of driven gears disposed on a drive shaft. Each of the plurality of drive gears is engaged with each of the plurality of driven gears to form a plurality of shift-gear pairs. An eight-speed drive gear, which forms an eight-speed shift-gear pair having the smallest reduction gear ratio, and a seven-speed drive gear, which forms a seven-speed shift-gear pair having the second smallest reduction gear ratio, are disposed adjacent one another at a center portion of an arrangement of the drive gears. An eight-speed driven gear, which forms the eight-speed shift-gear pair, and a seven-speed driven gear, which forms the seven-speed shift-gear pair, are disposed adjacent one another at a center portion of an arrangement of the driven gears.

5 Claims, 8 Drawing Sheets

(56) References Cited

U.S. PATENT DOCUMENTS

| | | | |
|---|---|---|---|
| 9,021,906 B2* | 5/2015 | Dreibholz | F16H 3/006 74/330 |
| 2011/0067512 A1* | 3/2011 | Kang | F16H 3/006 74/330 |

* cited by examiner

FIG.5

| DISPOSITION | SHIFT STAGE | TYPE OF GEAR | |
|---|---|---|---|
| | | DRIVE GEAR | DRIVEN GEAR |
| FIRST | ONE OF ONE-SPEED AND TWO-SPEED (ONE-SPEED) | FIXED GEAR | FREE GEAR |
| SECOND | DIFFERENT FROM FIRST SHIFT-GEAR PAIR BY FOUR (FIVE-SPEED) | FREE GEAR | SLIDE GEAR |
| THIRD | DIFFERENT FROM FOURTH SHIFT-GEAR PAIR BY FOUR (FOUR-SPEED) | SLIDE GEAR | FREE GEAR |
| FOURTH | ONE OF SEVEN-SPEED AND EIGHT-SPEED (EIGHT-SPEED) | FREE GEAR | FIXED GEAR |
| ARRANGEMENT CENTER | | | |
| FIFTH | ANOTHER OF SEVEN-SPEED AND EIGHT-SPEED (SEVEN-SPEED) | FREE GEAR | FIXED GEAR |
| SIXTH | DIFFERENT FROM FIFTH SHIFT-GEAR PAIR BY FOUR (THREE-SPEED) | SLIDE GEAR | FREE GEAR |
| SEVENTH | DIFFERENT FROM EIGHTH SHIFT-GEAR PAIR BY FOUR (SIX-SPEED) | FREE GEAR | SLIDE GEAR |
| EIGHTH | ANOTHER OF ONE-SPEED AND TWO-SPEED (TWO-SPEED) | FIXED GEAR | FREE GEAR |

TRANSMISSION MECHANISM

CROSS-REFERENCE TO RELATED APPLICATIONS

This application is based upon and claims the benefit of priority of the prior Japanese Patent Application No. 2016-022652, filed on Feb. 9, 2016, the entire contents of which are incorporated herein by reference.

BACKGROUND OF THE INVENTION

Field of the Invention

The present invention relates to a transmission mechanism.

Description of the Related Art

As a transmission mechanism for vehicle, a constant-mesh type transmission mechanism has been known. Patent Document 1 discloses a constant-mesh type transmission mechanism including two shafts: a counter shaft and a drive shaft. In such transmission mechanism, a plurality of driving gears are disposed on the counter shaft where rotative power is transmitted from a crankshaft, and a plurality of driven gears are disposed on the drive shaft that outputs the rotative power. Each of the plurality of driving gears is constantly engaged with each of the plurality of driven gears. Then, changing a transmission route of the rotative power from the counter shaft to the drive shaft shifts gears.

A six-speed is widely used for such constant-mesh type transmission mechanism. However, a further multistage is required in order to ensure both improvement of fuel efficiency during high-speed running and securement of acceleration performance during acceleration. As a configuration to ensure the multistage of the constant-mesh type transmission mechanism, Patent Document 2 discloses a configuration that adds a two-speed auxiliary transmission mechanism to a five-speed main transmission mechanism.

Patent Document 1: Japanese Laid-open Patent Publication No. 2005-127392

Patent Document 2: Japanese Laid-open Patent Publication No. 61-189347

However, in the configuration that adds the auxiliary transmission mechanism, it is necessary to add a rotation shaft for adjusting a rotation direction of the output rotative power and a mechanism for operating the auxiliary transmission mechanism, thus the configuration becomes complicated. On the other hand, in order to ensure the further multistage in the transmission mechanism including the two shafts: the counter shaft and the drive shaft, it is necessary to increase the number of the driving gears disposed on the counter shaft and the number of the driven gears disposed on the drive shaft. Therefore, it is necessary to extend the counter shaft and the drive shaft, thus deflections at center portions in longitudinal directions of the counter shaft and the drive shaft become large.

SUMMARY OF THE INVENTION

In consideration of the above-described actual condition, the object of the present invention is to ensure the further multistage in the transmission mechanism including the two shafts: the counter shaft and the drive shaft, while suppressing deformation of the counter shaft and the drive shaft.

To achieve the above-described object, the present invention includes an input shaft to which a rotative power is transmitted, a plurality of drive gears arranged in an axial direction on the input shaft, an output shaft that outputs a rotative power outside, and a plurality of driven gears arranged in an axial direction on the output shaft, and each of the plurality of drive gears is engaged with each of the plurality of driven gears so as to ensure transmission of the rotative power to form a plurality of shift-gear pairs having mutually different reduction gear ratios, a first drive gear included in a first shift-gear pair and a second drive gear included in a second shift-gear pair are adjacent one another at a center portion of an arrangement of the plurality of drive gears, the first shift-gear pair has a smallest reduction gear ratio among the plurality of shift-gear pairs, and the second shift-gear pair has a small reduction gear ratio next to the first shift-gear pair, and a first driven gear included in the first shift-gear pair and a second driven gear included in the second shift-gear pair are adjacent one another at a center portion of an arrangement of the plurality of driven gears.

The present invention may have a configuration where the plurality of drive gears include slide gears reciprocatable in the axial direction of the input shaft, and free gears disposed adjacent to the slide gears in the axial direction of the input shaft and rotatable relative to the input shaft, the plurality of driven gears include slide gears reciprocatable in the axial direction of the output shaft, and free gears disposed adjacent to the slide gears in the axial direction of the output shaft and rotatable relative to the output shaft, convex portions projecting from end surfaces in the axial direction of teeth are disposed on ones of the slide gears and the free gears included in the plurality of drive gears and adjacent one another, hollow portions depressing from end surfaces in the axial direction of teeth are disposed on others, and the convex portions are fitted into the hollow portions to couple the slide gears and the free gears included in the plurality of drive gears and adjacent one another so as to ensure the transmission of the rotative power, and convex portions projecting from end surfaces in the axial direction of teeth are disposed on ones of the slide gears and the free gears included in the plurality of driven gears and adjacent one another, hollow portions depressing from end surfaces in the axial direction of teeth are disposed on others, and the convex portions are fitted into the hollow portions to couple the slide gears and the free gears included in the plurality of driven gears and adjacent one another so as to ensure the transmission of the rotative power.

The present invention may have a configuration where each of the plurality of slide gears included in the plurality of drive gears and the plurality of driven gears is adjacent to two free gears having mutually different outside diameters among the plurality of free gears, a hollow portion is disposed on a free gear having a large diameter of the two free gears, the hollow portion ensures insert of an end portion in an axial direction of the slide gear adjacent to the free gear having the large diameter, and when the free gear having the large diameter is coupled to the slide gear adjacent to the free gear having the large diameter so as to ensure the transmission of the rotative power, a part of the free gear having the large diameter is superimposed on a part of the slide gear adjacent to the free gear having the large diameter, viewed from a direction perpendicular to a rotational center line.

The present invention may have a configuration where differences of counts of shift stages of the free gears having the large diameters and counts of shift stages of the slide gears adjacent to the free gears having the large diameter are all identical.

The present invention may have a configuration where the plurality of drive gears further include a plurality of fixed gears that are nonmovable in the axial direction with respect to the input shaft and integrally rotate with the input shaft, and the free gears, the slide gears, and the fixed gears included in the plurality of drive gears are symmetrically disposed about a center of the arrangement of the plurality of drive gears.

The present invention may have a configuration where the plurality of driven gears further include a plurality of fixed gears that are nonmovable in the axial direction with respect to the output shaft and integrally rotate with the output shaft, and the free gears, the slide gears, and the fixed gears included in the plurality of driven gears are symmetrically disposed about a center of the arrangement of the plurality of driven gears.

BRIEF DESCRIPTION OF THE DRAWINGS

FIG. 5 is a table that summarizes an arrangement of shift-gear pairs, and types of drive gears and driven gears that form the shift-gear pairs;

DETAILED DESCRIPTION OF THE PREFERRED EMBODIMENTS

The following describes an embodiment of the present invention in detail with reference to the drawings. The embodiment of the present invention shows an example where a transmission mechanism is applied to an engine unit of a motorcycle. For convenience of explanation, each direction of the motorcycle is based on a direction viewed from an occupant that rides the motorcycle. In each drawing, as necessary, at the motorcycle, a front side is indicated by an arrow Fr, a rear side is indicated by an arrow Rr, a right side is indicated by an arrow R, a left side is indicated by an arrow L, an upper side is indicated by an arrow Up, and a downside is indicated by an arrow Dn.

Overall Configuration of Motorcycle

Figure 1:
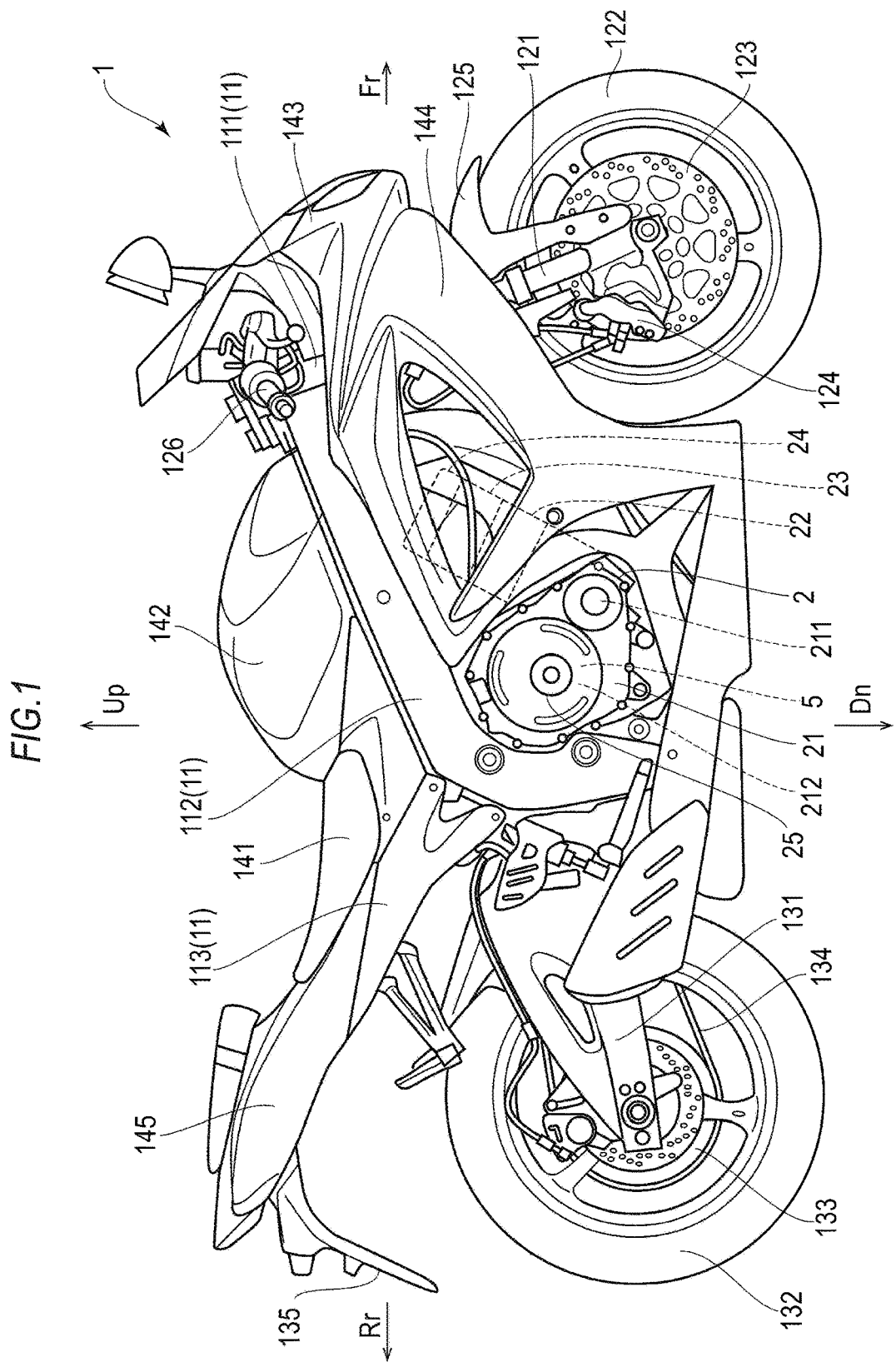
FIG. 1 is a right side view schematically illustrating an exemplary configuration of a motorcycle.

First, a description will be given of an exemplary overall configuration of a motorcycle 1 where a transmission mechanism 5 according to the embodiment is applied, with reference to FIG. 1. FIG. 1 is a right side view schematically illustrating the exemplary configuration of the motorcycle 1.

A vehicle body frame 11 of the motorcycle 1 includes a steering head pipe 111 and aright and left pair of main frames 112. The steering head pipe 111 has a tubular configuration that inclines rearward. The right and left pair of main frames 112 are integrally bonded on the steering head pipe 111 at front end portions and enlarge a distance in a vehicle-width direction from the steering head pipe 111 to extend rearward and obliquely downward. Aright and left pair of seat rails 113 are mounted on rear portions of the main frames 112. The right and left pair of seat rails 113, which are members that support a seat 141, extend from the rear portions of the main frames 112 rearward and obliquely upward at a predetermined distance in the vehicle-width direction. Respective portions of the vehicle body frame 11, which are made of, for example, a steel material or an aluminum alloy material, are integrally bonded by welding or similar method.

A steering shaft (not illustrated in hiding in FIG. 1), a right and left pair of front forks 121, and a front wheel 122 are disposed on a front side of the vehicle body frame 11. The steering shaft is inserted into the steering head pipe 111 to be rotatably supported by the steering head pipe 111. The right and left pair of front forks 121 are coupled to the steering shaft via, for example, a bracket to rotate integrally with the steering shaft. The front wheel 122 is rotatably supported by lower end portions of the right and left pair of front forks 121. A brake disc 123, which rotates integrally with the front wheel 122, is mounted on the front wheel 122. A brake caliper 124 of the front wheel 122, and a front fender 125, which covers an upper side of the front wheel 122, are mounted on the right and left pair of front forks 121. A right and left handlebars 126 (handle grips) are mounted on each upper end portion of the right and left pair of front forks 121. A clutch lever for operating a clutch 26 is disposed on the left side handlebar 126. A brake lever that operates a brake of a rear wheel 132 is disposed on the right side handlebar 126. A shift lever for the occupant operating the transmission mechanism 5 is disposed on a left side lower portion in the vehicle-width direction of the vehicle body frame 11.

A swing arm 131 is coupled to a rear portion of the vehicle body frame 11. The swing arm 131 is swingable in a vertical direction (a pitching direction). The rear wheel 132, which is an exemplary driving wheel, is rotatably supported by a rear end portion of the swing arm 131. A driven sprocket 133, which rotates integrally with the rear wheel 132, is mounted on a left side of the rear wheel 132. A drive chain 134 is wound across the driven sprocket 133 and a drive sprocket 30 (described below) of an engine unit 2. Then, the rotative power output by the engine unit 2 is transmitted to the rear wheel 132 via the drive sprocket 30 and the drive chain 134. A shock absorber (not illustrated) is disposed between the vehicle body frame 11 and the swing arm 131. This shock absorber absorbs and mitigates oscillation and impact transmitted from the rear wheel 132 to the vehicle body frame 11. Additionally, a rear fender 135 is disposed above the rear wheel 132.

The seat 141 where the occupants (a rider and a pillion passenger) are seated is disposed on upper sides of the seat rails 113. A fuel tank 142 is disposed on a front side of the seat 141 and upper sides of the main frames 112. Additionally, the motorcycle 1 includes a front cowl 143, side cowls 144, and a seat cowl 145, as exterior members. The front cowl 143 covers a front portion the motorcycle 1. The side cowls 144 cover side portions of the motorcycle 1. The seat cowl 145 covers a periphery of the seat 141. Testaceous members made of, for example, synthetic resin material are applied to these exterior members. These exterior members constitute an exterior design of the motorcycle 1.

The engine unit 2 includes an engine portion (an internal-combustion portion), which is a driving force source of the motorcycle 1, the transmission mechanism 5, which shifts gears of the rotative power of the engine portion to output, and the clutch 26, which engages and disengages transmission of the rotative power between the engine portion and the transmission mechanism 5. These members are integrally attached. Then, the engine unit 2 is suspended on the vehicle body frame 11. The engine unit 2 has also a function of a strength member of the motorcycle 1. The engine unit 2 includes a crankcase 21, a cylinder block 22, a cylinder head 23, and a cylinder head cover 24.

A crank chamber 211 is disposed nearer a front side of an inside of the crankcase 21. A transmission chamber 212 is disposed nearer a rear side of the inside of the crankcase 21. A clutch cover 25 is mounted on a right side surface of the crankcase 21. A magneto cover is mounted on a left side surface of the crankcase 21.

A crankshaft 29 is rotatably housed in the crank chamber 211 such that an axis line (a rotational center line) of the crankshaft 29 is in a direction parallel to a lateral direction (the vehicle-width direction). A primary drive gear 27 is disposed on one end portion (a right side end portion in the embodiment) in an axial direction of the crankshaft 29, as the primary drive gear 27 rotates integrally with the crankshaft 29. The primary drive gear 27 is a gear for transmitting the rotative power to the transmission mechanism 5, which is described later. A magneto is coupled to the other end portion (a left side end portion in the embodiment) in the axial direction of the crankshaft 29. The magneto is a generator that generates electricity by the rotative power transmitted from the crankshaft 29. The magneto is covered with the magneto cover mounted on the left side surface of the crankcase 21.

The transmission mechanism 5 and the clutch 26 are disposed inside the transmission chamber 212. The transmission mechanism 5 shifts gears of the rotative power input from the crankshaft 29 to output to the rear wheel 132, which is the exemplary driving wheel. A configuration of the transmission mechanism 5 will be described later in detail. The clutch 26 engages and disengages the transmission of the rotative power between the engine portion and the transmission mechanism 5. Various known clutches, such as a multiplate wet clutch, are applicable to the clutch 26. The clutch 26 is disposed on one end portion (a right side end portion in the embodiment) in an axial direction of the counter shaft 51, as being coaxial with the counter shaft 51. Then, the clutch 26 is covered with the clutch cover 25 mounted on the right side surface of the crankcase 21.

The cylinder block 22 is disposed on an upper side nearer a front side (that is, a part where the crank chamber 211 is disposed) of the crankcase 21. Predetermined number of (for example, four) combustion chambers (cylinders) are disposed inside the cylinder block 22, for example, as being aligned in the lateral direction (the vehicle-width direction). A piston is reciprocatably housed in each combustion chamber. Each piston is coupled to the crankshaft 29 by a connecting rod. The cylinder head 23 is disposed on an upper side of the cylinder block 22. The cylinder head 23 includes intake ports, which are intake paths, and exhaust ports, which are exhaust paths, for each of the predetermined number of combustion chambers. Further, the cylinder head 23 includes intake valves, which open and close the intake ports, exhaust valves, which open and close the exhaust ports, and a valve drive mechanism, which drives the intake valves and the exhaust valves. The cylinder head cover 24 is disposed on an upper side of the cylinder head 23. The cylinder head cover 24 covers the intake valves, the exhaust valve, the valve drive mechanism, and similar member included in the cylinder head 23.

An air cleaner is disposed above the engine unit 2. The air cleaner purifies combustion air that the engine unit 2 uses. The air cleaner is coupled to the respective intake ports via intake paths that ensure pass of the combustion air. The respective intake paths include throttle bodies that adjust flow rates of the combustion air.

An exhaust pipe, which is a passage of exhaust gas, is coupled to the exhaust ports included in the cylinder head 23. Then, a muffler is coupled to a rear end of the exhaust pipe. The exhaust gas from the respective combustion chambers is discharged outside through the exhaust ports, the exhaust pipe, and the muffler.

Transmission Mechanism

Figure 2:
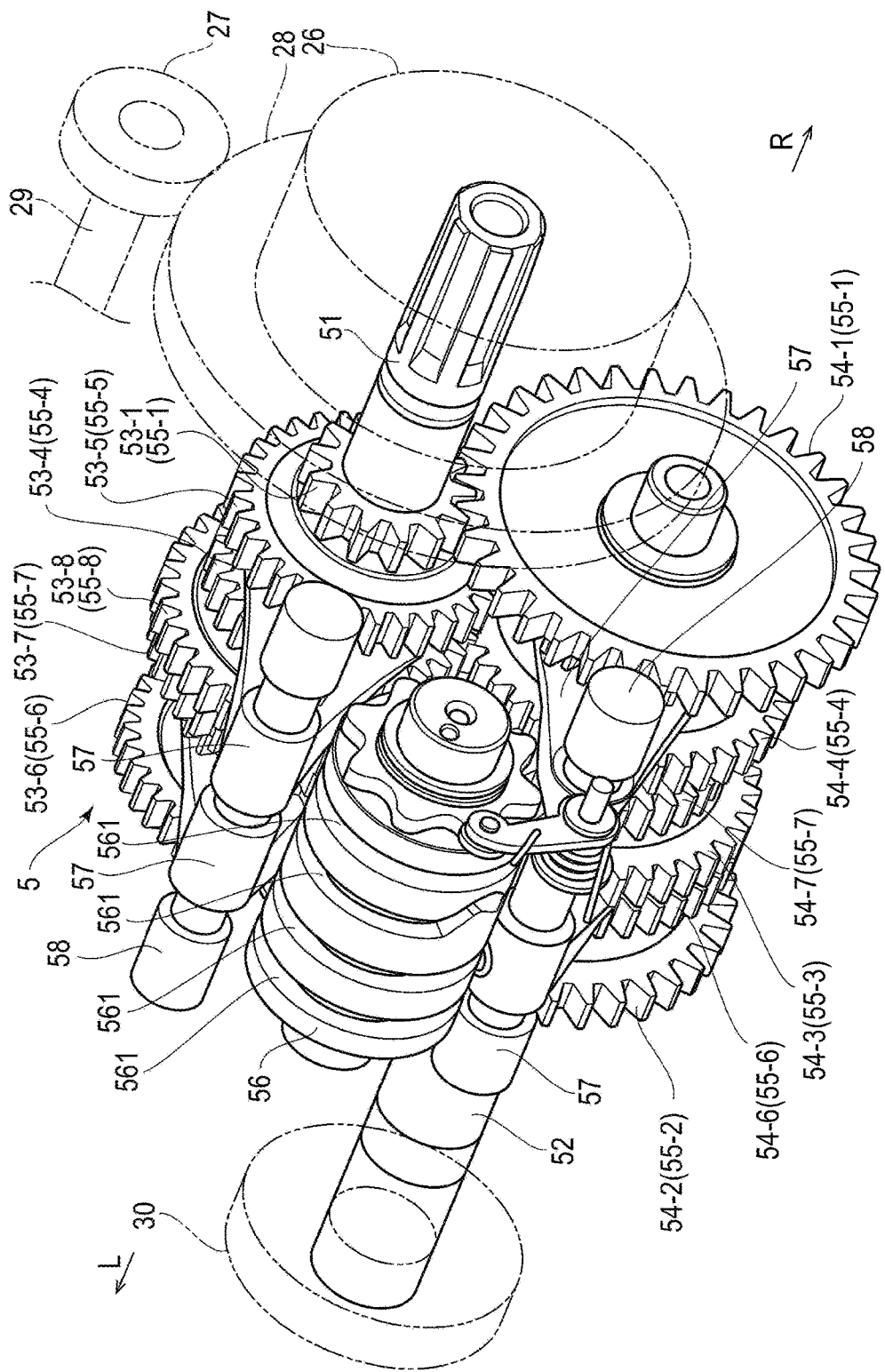
FIG. 2 is a perspective view schematically illustrating an exemplary configuration of a transmission mechanism.
Figure 3:
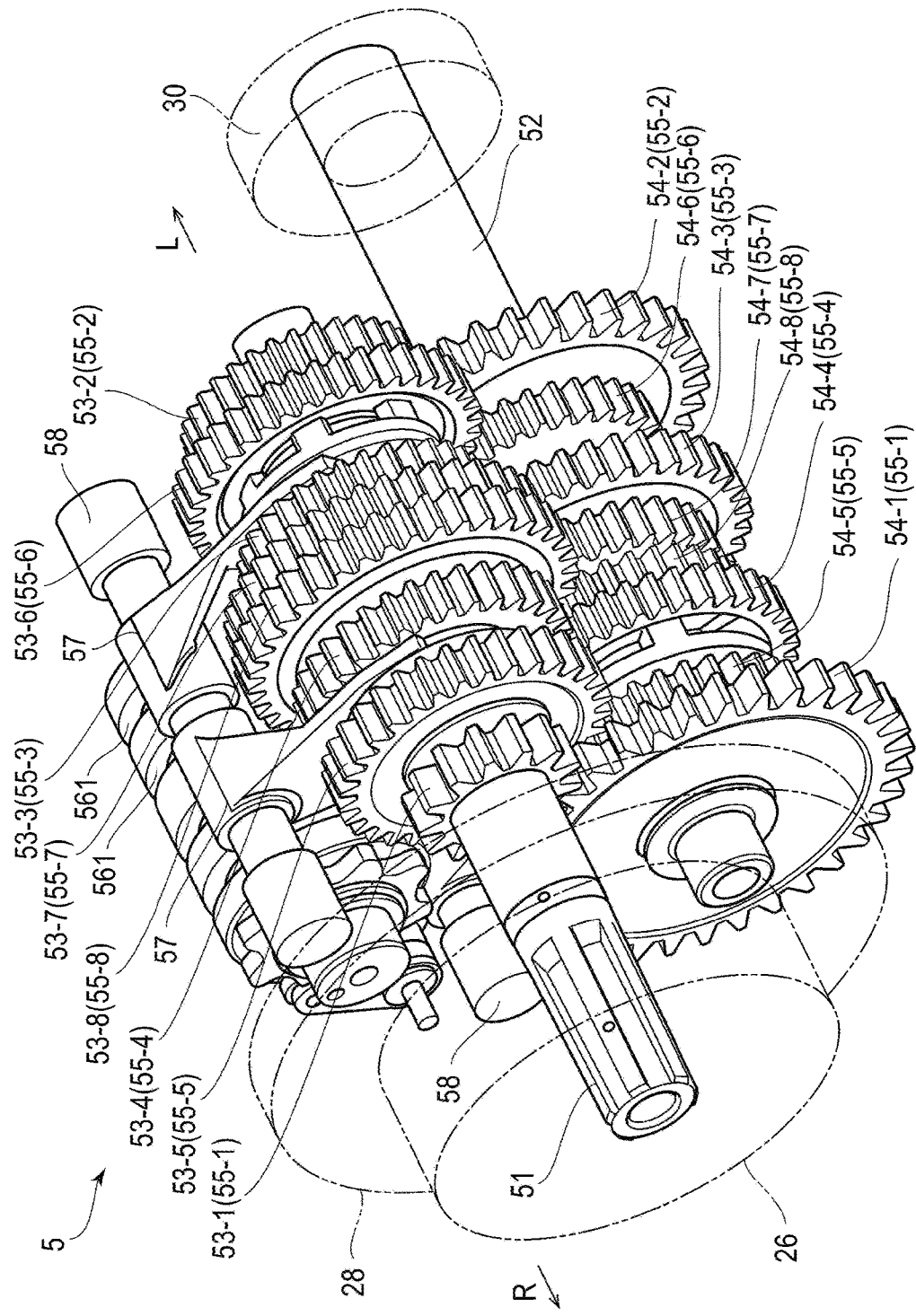
FIG. 3 is a perspective view schematically illustrating the exemplary configuration of the transmission mechanism.

The following describes an exemplary configuration of the transmission mechanism 5. FIG. 2 and FIG. 3 are perspective views schematically illustrating the exemplary configuration of the transmission mechanism 5. The transmission mechanism 5 is a constant-mesh type. The embodiment shows an example where a total number of shift stages of the transmission mechanism 5 is eight. As illustrated in FIG. 2 and FIG. 3, the transmission mechanism 5 includes two transmission shafts: a counter shaft 51 and a drive shaft 52, and transmission gears: predetermined number of (but, a plurality of) drive gears 53-1 to 53-8 and predetermined number of (a plurality of) driven gears 54-1 to 54-8. Furthermore, the transmission mechanism 5 includes a shift cam 56, predetermined number of shift forks 57, and two shift fork guides 58, which movably support the shift forks 57.

The counter shaft 51 is an input shaft where the rotative power is transmitted from an outside of the transmission mechanism 5 (the crankshaft 29). The drive shaft 52 is an output shaft that transmits (outputs) the rotative power to the outside (the rear wheel 132, which is the exemplary driving wheel) of the transmission mechanism 5. The counter shaft 51 and the drive shaft 52 are rotatably housed in the transmission chamber 212 in a direction where axis lines (rotational center lines) of the counter shaft 51 and the drive shaft 52 are parallel one another and parallel to the lateral direction (the vehicle-width direction). Then, the counter shaft 51 and the drive shaft 52 are rotatably supported on the crankcase 21 by bearings 511R and 511L, and 521R and 521L (Not illustrated in FIG. 2 and FIG. 3. See FIG. 4 and FIG. 7.).

A primary driven gear 28 and the clutch 26 are disposed at the proximity of the right side end portion of the counter shaft 51. The primary driven gear 28 is coaxial with the counter shaft 51 and rotatable relative to the counter shaft 51. The primary driven gear 28 is engaged with the primary drive gear 27 disposed on the crankshaft 29 to rotate such that the rotative power from the engine portion (the crankshaft 29) is transmitted. The clutch 26 engages and disengages the transmission of the rotative power between the primary driven gear 28 and the counter shaft 51. Thus, the rotative power from the crankshaft 29 is transmitted (input) to the counter shaft 51, which is the input shaft of the transmission mechanism 5, via the primary drive gear 27, the primary driven gear 28, and the clutch 26. Thus, the counter shaft 51 functions as the input shaft where the rotative power is transmitted (input) from the outside (the engine portion) of the transmission mechanism 5.

One end part of the drive shaft 52 projects from the left side surface of the crankcase 21 to an outside of the crankcase 21. The drive sprocket 30 is disposed on this projecting part, as the drive sprocket 30 integrally rotates with the projecting part. The drive chain 134 is wound across the drive sprocket 30 and the driven sprocket 133 of the rear wheel 132. Then, the rotative power from the drive shaft 52 is transmitted to the rear wheel 132 via the drive chain 134. Thus, the drive shaft 52 functions as the output shaft that transmits (outputs) the rotative power to the outside (the rear wheel 132, which is the driving wheel) of the transmission mechanism 5.

The eight drive gears 53-1 to 53-8, whose number is equal to the total number of shift stages of the transmission mechanism 5, are arranged in the axial direction of the counter shaft 51, on the counter shaft 51.

The eight drive gears 53-1 to 53-8 include fixed gears secured as being nonmovable in the axial direction with respect to the counter shaft 51. The fixed gears rotate integrally with the counter shaft 51. For example, a configuration integrally disposed on the counter shaft 51 or a configuration secured to the counter shaft 51 by, for example, a key is applied to the fixed gears included in the drive gears 53-1 to 53-8. The drive gears 53-1 to 53-8 include slide gears reciprocatable in the axial direction with respect to the counter shaft 51. The slide gears rotate integrally with the counter shaft 51. For example, a configuration splined to the counter shaft 51 is applied to the slide gears included in the drive gears 53-1 to 53-8. The drive gears 53-1 to 53-8 include free gears nonmovable in the axial direction with respect to the counter shaft 51. However, the free gears are rotatable relative to the counter shaft 51. The free gears included in the drive gears 53-1 to 53-8 are rotatably supported on the counter shaft 51 by a bearing such as a needle bearing.

The eight driven gears 54-1 to 54-8 include fixed gears secured as being nonmovable in an axial direction with respect to the drive shaft 52. The fixed gears rotate integrally with the drive shaft 52. The driven gears 54-1 to 54-8 include slide gears reciprocatable in the axial direction with respect to the drive shaft 52. The slide gears rotate integrally with the drive shaft 52. The driven gears 54-1 to 54-8 include free gears nonmovable in the axial direction with respect to the drive shaft 52. However, the free gears are rotatable relative to the drive shaft 52. Configurations of the fixed gears, the slide gears, and the free gears included in the driven gears 54-1 to 54-8 may be identical to the configurations of the fixed gears, the slide gears, and the free gears included in the drive gears 53-1 to 53-8 respectively.

The eight driven gears 54-1 to 54-8, whose number is equal to the total number of shift stages of the transmission mechanism 5, are arranged in the axial direction of the drive shaft 52, on the drive shaft 52. The eight driven gears 54-1 to 54-8, similarly to the eight drive gears 53-1 to 53-8, include two fixed gears, two slide gears, and four free gears. The fixed gears of the eight driven gears 54-1 to 54-8 are nonmovable in the axial direction with respect to the drive shaft 52 and rotate integrally with the drive shaft 52. The slide gears of the driven gears 54-1 to 54-8 are movable in the axial direction with respect to the drive shaft 52 and rotate integrally with the drive shaft 52. The free gears of the driven gears 54-1 to 54-8 are nonmovable in the axial direction with respect to the drive shaft 52. However, the free gears are rotatable relative to the drive shaft 52.

Each of the eight drive gears 53-1 to 53-8 is constantly engaged with each of the eight driven gears 54-1 to 54-8 so as to ensure the transmission of the rotative power. For convenience of explanation, pairs of the drive gears 53-1 to 53-8 and the driven gears 54-1 to 54-8 being engaged one another are referred to as "shift-gear pairs." The transmission mechanism 5 includes eight shift-gear pairs 55-1 to 55-8, whose number is equal to the total number of shift stages.

A cylindrical cam having an approximately cylindrical shape is applied to the shift cam 56. The shift cam 56 is disposed in a direction where its axis line (rotational center line) is parallel to the axis lines of the counter shaft 51 and the drive shaft 52. Four cam grooves 561, whose number is equal to the total number of (four in the embodiment) slide gears included in the drive gears 53-1 to 53-8 and the driven gears 54-1 to 54-8, are disposed on aside surface of the shift cam 56.

The two shift fork guides 58, which are both approximately rod-shaped members, are disposed in a direction where these longitudinal directions are parallel to the axial directions (the lateral directions) of the counter shaft 51 and the drive shaft 52. One of the two shift fork guides 58 supports two shift forks 57, whose number is equal to the total number of (two in the embodiment) slide gears included in the drive gears 53-1 to 53-8, reciprocatably in the longitudinal direction (the lateral direction). Similarly, the other shift fork guide 58 supports two shift forks 57, whose number is equal to the total number of (two in the embodiment) slide gears included in the driven gears 54-1 to 54-8, reciprocatably in the longitudinal direction (the lateral direction). Each of the four shift forks 57 is engaged with each of the four cam grooves 561 disposed on the shift cam 56. Then, each of the two shift forks 57 supported by the one shift fork guide 58 is engaged with each of the two slide gears included in the drive gears 53-1 to 53-8. Each of the two shift forks 57 supported by the other shift fork guide 58 is engaged with each of the two slide gears included in the driven gears 54-1 to 54-8. Then, each of the four shift forks 57 moves each of the four slide gears in the axial directions of the counter shaft 51 and the drive shaft 52 corresponding to rotation of the shift cam 56.

Additionally, the transmission mechanism 5 includes a shift cam driving mechanism, which rotates the shift cam 56 corresponding to operation of the shift lever by the occupant, and a shift holding mechanism, which holds a rotation direction position of the shift cam 56. The shift cam driving mechanism transmits movement of the shift lever to the shift cam 56 to rotate the shift cam 56. The shift cam driving mechanism may have a configuration that includes a sensor, which detects the movement of the shift lever, and an actuator such as a motor, which rotates the shift cam 56 to cause the actuator to rotate the shift cam 56 corresponding to the movement of the shift lever detected by the sensor. In short, it is only necessary that the shift cam driving mechanism is configured to rotate the shift cam 56 corresponding to the operation of the shift lever by the occupant.

Configuration of Drive Gear and Driven Gear

Figure 4:
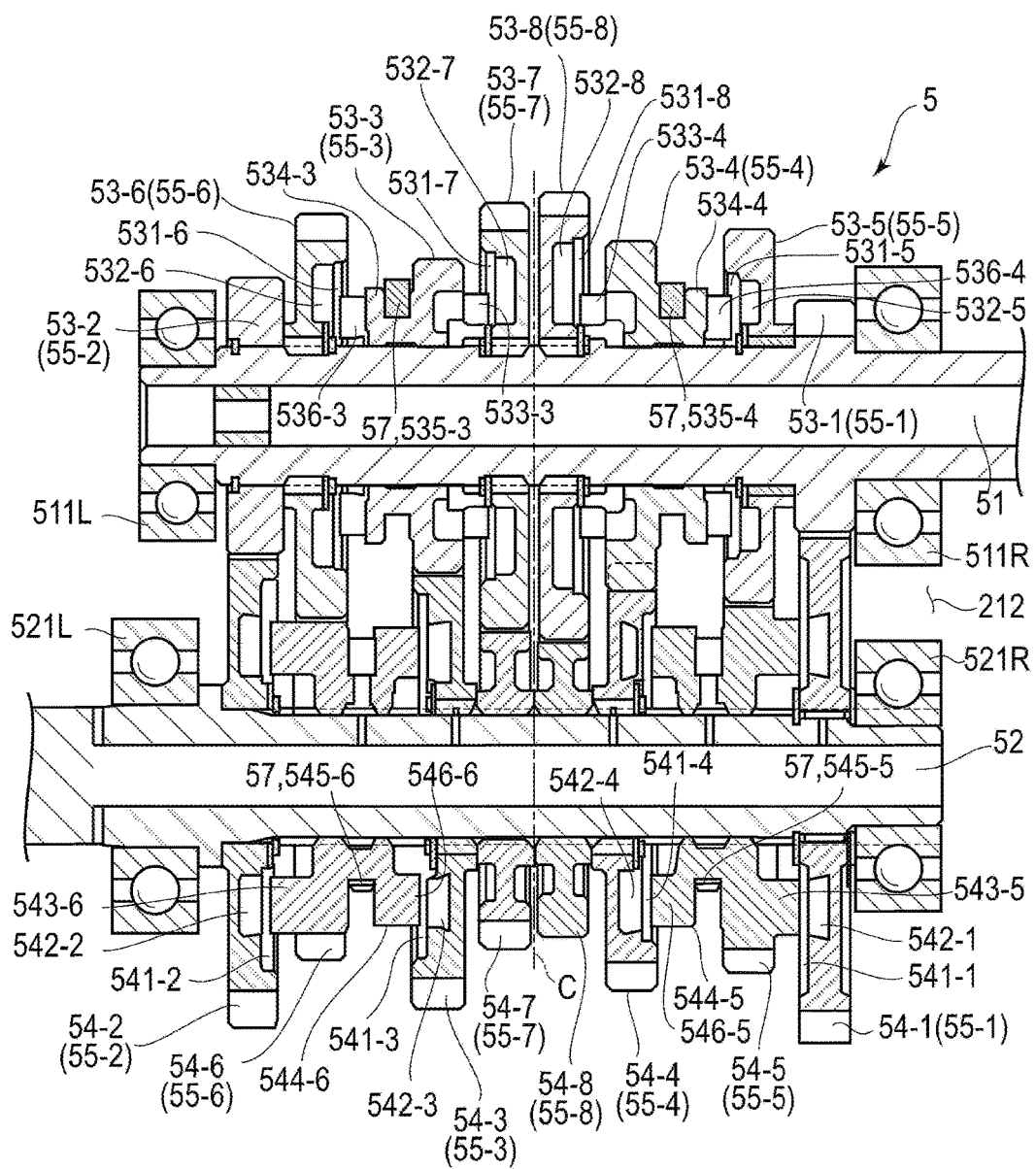
FIG. 4 is a cross-sectional view schematically illustrating the exemplary configuration of the transmission mechanism.

The following describes an exemplary configuration of the drive gears 53-1 to 53-8 and the driven gears 54-1 to 54-8 with reference to FIG. 4. FIG. 4 is a cross-sectional view schematically illustrating the exemplary configuration of the transmission mechanism 5, and a drawing schematically illustrating a cross-sectional surface where the transmission mechanism 5 is cut off at a plane including the axis line of the counter shaft 51 and the axis line of the drive shaft 52.

As illustrated in FIG. 4, the counter shaft 51 and the drive shaft 52 are rotatably supported on the crankcase 21 by the two bearings 511R and 511L, and the two bearings 521R and 521L respectively. The two bearings 511R and 511L and the two bearings 521R and 521L are disposed separately at a predetermined distance in the axial direction. Then, the eight drive gears 53-1 to 53-8, whose number is equal to the total number of shift stages of the transmission mechanism 5, are arranged in the axial direction (the lateral direction) between these two bearings 511R and 511L on the counter shaft 51. Similarly, the eight driven gears 54-1 to 54-8, whose number is equal to the total number of shift stages of the transmission mechanism 5, are arrange in the axial direction (the lateral direction) between these two bearings 521R and 521L on the drive shaft 52. With such configuration, among the eight drive gears 53-1 to 53-8 and the eight driven gears 54-1 to 54-8, two drive gears 53-7 and 53-8 and two driven gears 54-7 and 54-8, which are positioned at center portions of arrangements, are the farthest from the bearings 511R, 511L, 521R, and 521L, and two drive gears 53-1 and 53-2 and two driven gears 54-1 and 54-2, which are positioned at both end portions of the arrangements, are the closest to the bearings 511R, 511L, 521R, and 521L.

It is only necessary that the transmission mechanism 5 has a configuration where the eight drive gears 53-1 to 53-8 are disposed between the two bearings 511R and 511L, and may have a configuration where other positions of the counter shaft 51 are support by bearings different from the two bearings 511R and 511L. Similarly, it is only necessary that the transmission mechanism 5 has a configuration where the eight driven gears 54-1 to 54-8 are disposed between the two bearings 521R and 521L, and may have a configuration where other positions of the drive shaft 52 are supported by bearings different from the two bearings 521R and 521L. However, the bearing is not disposed between the respective eight drive gears 53-1 to 53-8. Similarly, the bearing is not disposed between the respective eight driven gears 54-1 to 54-8. That is, among the eight drive gears 53-1 to 53-8, each of the two drive gears 53-1 and 53-2, which are positioned at both ends of the arrangement, is adjacent to each of the two bearings 511R and 511L. The other six drive gears 53-3 to 53-8 are respectively adjacent to the others of the drive gears 53-1 to 53-8, and not adjacent to the bearings 511R and 511L. The same applies to the driven gears 54-1 to 54-8.

Each of the eight drive gears 53-1 to 53-8 is constantly engaged with each of the eight driven gears 54-1 to 54-8 so as to ensure the transmission of the rotative power. This forms the eight shift-gear pairs 55-1 to 55-8 constituted of the drive gears 53-1 to 53-8 and the driven gears 54-1 to 54-8, which are engaged one another. The eight shift-gear pairs 55-1 to 55-8 are each corresponding to one-speed to eight-speed shift stages (shift positions). For reduction gear ratios of the eight shift-gear pairs 55-1 to 55-8, the one of the eight-speed shift-gear pair 55-8 is smallest, the ones of the seven-speed shift-gear pair 55-7, the six-speed shift-gear pair 55-6, the five-speed shift-gear pair 55-5, the four-speed shift-gear pair 55-4, the three-speed shift-gear pair 55-3, and the two-speed shift-gear pair 55-2 increase in this order, and the one of the one-speed shift-gear pair 55-1 is largest.

Then, the eight drive gears 53-1 to 53-8 and the eight driven gears 54-1 to 54-8 are disposed as being aligned in predetermined orders in the axial directions, on the counter shaft 51 and the drive shaft 52 respectively. In view of this, the eight shift-gear pairs 55-1 to 55-8 also are aligned in the predetermined order in the axial directions of the counter shaft 51 and the drive shaft 52. Here, the arrangement of the eight shift-gear pairs 55-1 to 55-8 will be described. The order of the arrangement of the eight drive gears 53-1 to 53-8 and the order of the arrangement of the eight driven gears 54-1 to 54-8 are identical to that of the eight shift-gear pairs 55-1 to 55-8. For convenience of explanation, a center position (a position between the fourth and fifth shift-gear pairs from an end) of the arrangement of the eight shift-gear pairs 55-1 to 55-8 may be referred to as an "arrangement center." In FIG. 4, FIG. 6A, FIG. 6B, and FIG. 7, the arrangement center is indicated by a dot-and-dash line C. The same applies to the eight drive gears 53-1 to 53-8 and the eight driven gears 54-1 to 54-8.

As illustrated in FIG. 4, the eight-speed shift-gear pair 55-8 having the smallest reduction gear ratio and the seven-speed shift-gear pair 55-7 having the second smallest reduction gear ratio are disposed as being adjacent one another at the center portion of the arrangement of the eight shift-gear pairs 55-1 to 55-8. That is, the eight-speed shift-gear pair 55-8 having the smallest reduction gear ratio and the seven-speed shift-gear pair 55-7 having the second smallest reduction gear ratio are disposed as being adjacent one another with sandwiching the arrangement center C. FIG. 4 illustrates an exemplary configuration where the eight-speed shift-gear pair 55-8 having the smallest reduction gear ratio is positioned nearer the right side, and the seven-speed shift-gear pair 55-7 having the second smallest reduction gear ratio is positioned nearer the left side. Each of the one-speed shift-gear pair 55-1 having the largest reduction gear ratio and the two-speed shift-gear pair 55-2 having the second largest reduction gear ratio is disposed on each of both ends of the arrangement of the eight shift-gear pairs 55-1 to 55-8. FIG. 4 illustrates an exemplary configuration where the one-speed shift-gear pair 55-1 having the largest reduction gear ratio is disposed on the right end of the arrangement, and the two-speed shift-gear pair 55-2 having the second largest reduction gear ratio is disposed on the left end of the arrangement.

The three-speed shift-gear pair 55-3 is disposed as being adjacent to a left side, which is an opposite side of a side adjacent to the eight-speed shift-gear pair 55-8, with respect to the seven-speed shift-gear pair 55-7. The four-speed shift-gear pair 55-4 is disposed as being adjacent to a right side, which is an opposite side of a side adjacent to the seven-speed shift-gear pair 55-7, with respect to the eight-speed shift-gear pair 55-8. Thus, a shift-gear pair (the eight-speed shift-gear pair 55-8) having the smallest reduction gear ratio and a shift-gear pair (the seven-speed shift-gear pair 55-7) having the second smallest reduction gear ratio are adjacent one another at the center portion of the arrangement of the eight shift-gear pairs 55-1 to 55-8. And, to opposite sides of the side where these shift-gear pairs are adjacent one another, shift-gear pairs where the differences of the number of shift stages are four (the respective four-speed shift-gear pair 55-4 and three-speed shift-gear pair 55-3) are adjacent.

The five-speed shift-gear pair 55-5 is disposed adjacent to the one-speed shift-gear pair 55-1. The six-speed shift-gear pair 55-6 is disposed adjacent to the two-speed shift-gear pair 55-2. Thus, the one-speed shift-gear pair 55-1 having the largest reduction gear ratio and the two-speed shift-gear pair 55-2 having the second largest reduction gear ratio are disposed on the respective both ends of the arrangement of the eight shift-gear pairs 55-1 to 55-8 and both are adjacent to the shift-gear pairs where the differences of the number of shift stages are four.

Such configuration can suppress deformation of the counter shaft 51 and the drive shaft 52. That is, a configuration where the arrangement of the eight drive gears 53-1 to 53-8 is disposed between the two bearings 511R and 511L is likely to be deformed most at a center position between the two bearings 511R and 511L when a force perpendicular to the axial direction is applied to the counter shaft 51 (A deformation amount is likely to increase). Then, when ensuring the further multistage in the transmission mechanism 5, a distance between the two bearings 511B and 511L increases corresponding to increase of the total number of shift stages, thus the counter shaft 51 becomes easily to be deformed. The same applies to the drive shaft 52. On the other hand, if outputs of the rotative power transmitted from the counter shaft 51 to the drive shaft 52 are identical, the larger the reduction gear ratios of the shift-gear pairs 55-1 to 55-8 are, the larger torque is, thus burdens (reactive forces) applied to the drive gears 53-1 to 53-8 and the driven gears 54-1 to 54-8 become large. In view of this, force (force perpendicular to the axial direction) being applied to the counter shaft 51 and the drive shaft 52 for pushing away one another becomes smallest at a position where a shift-gear pair having the smallest reduction gear ratio is disposed, and becomes largest at a position where a shift-gear pair having the largest reduction gear ratio is disposed.

Therefore, the eight-speed shift-gear pair 55-8 having the smallest reduction gear ratio and the seven-speed shift-gear pair 55-7 having the second smallest reduction gear ratio are disposed as being adjacent one another at the center portion of the arrangement of the eight shift-gear pairs 55-1 to 55-8. That is, the eight-speed drive gear 53-8 and the seven-speed drive gear 53-7 are disposed at positions (positions closest to the center position between the two bearings 511R and 511L) farthest from the two bearings 511R and 511L, which support the counter shaft 51. Similarly, the eight-speed driven gear 54-8 and the seven-speed driven gear 54-7 are disposed at positions farthest from the two bearings 521R and 521L, which support the drive shaft 52. Such configuration can reduce force (force distancing one another) applied to a position that is most likely to be deformed for each of the counter shaft 51 and the drive shaft 52. This can suppress the deformation of the counter shaft 51 and the drive shaft 52 even when the total number of shift stages of the transmission mechanism 5 is increased from conventional and general six-speed to eight-speed as the embodiment. Accordingly, suppression of strength decreases of the counter shaft 51 and the drive shaft 52, and suppression of decreased sensation of shifting operation by the occupant can be ensured.

Each of the one-speed shift-gear pair 55-1 having the largest reduction gear ratio and the two-speed shift-gear pair 55-2 having the second largest reduction gear ratio is disposed on each of both ends of the arrangement of the eight shift-gear pairs 55-1 to 55-8. Both ends of the arrangement of the eight shift-gear pairs 55-1 to 55-8 are positions closest to the bearings 511R and 511L, or 521R and 521L on any of the counter shaft 51 and the drive shaft 52. In view of this, the configuration where the one-speed shift-gear pair 55-1 having the largest reduction gear ratio and the two-speed shift-gear pair 55-2 having the second largest reduction gear ratio are disposed on the positions closest to the respective bearings 511R and 511L, and 521R and 521L can suppress the deformation in directions perpendicular to the axial directions of the counter shaft 51 and the drive shaft 52.

Thus, the embodiment can suppress the deformation of the counter shaft 51 and the drive shaft 52. Accordingly, the embodiment ensures the further multistage of the transmission mechanism 5 while suppressing the deformation of the counter shaft 51 and the drive shaft 52. Especially, the embodiment can increase the total number of shift stages of the transmission mechanism 5 from conventional and general six-speed to eight-speed while suppressing the deformation of the counter shaft 51 and the drive shaft 52. The suppression of strength decreases of the counter shaft 51 and the drive shaft 52, and the suppression of decreased sensation of shifting operation by the occupant can be ensured.

The following describes the arrangements of the eight drive gears 53-1 to 53-8 and the eight driven gears 54-1 to 54-8. As described above, the eight drive gears 53-1 to 53-8 include the two fixed gears, the two slide gears, and the four free gears. The eight driven gears 54-1 to 54-8 also include the two fixed gears, the two slide gears, and the four free gears.

Among the eight drive gears 53-1 to 53-8, the free gears are applied to the seven-speed drive gear 53-7 and the eight-speed drive gear 53-8, which are adjacent one another at the center portion of the arrangement. The slide gears are applied to the three-speed drive gear 53-3 and the four-speed drive gear 53-4, which are adjacent to the opposite sides of the sides where the seven-speed drive gear 53-7 and the eight-speed drive gear 53-8 are adjacent one another. The fixed gears are applied to the one-speed drive gear 53-1 and the two-speed drive gear 53-2, which are positioned at both ends of the arrangement. The free gears are applied to the five-speed drive gear 53-5 and the six-speed drive gear 53-6, which are adjacent to the one-speed drive gear 53-1 and the two-speed drive gear 53-2 respectively.

Among the eight driven gears 54-1 to 54-8, the fixed gears are applied to the seven-speed driven gear 54-7 and the eight-speed driven gear 54-8, which are adjacent one another at the center portion of the arrangement. The free gears are applied to the three-speed driven gear 54-3 and the four-speed driven gear 54-4, which are adjacent to the opposite sides of the side where the seven-speed driven gear 54-7 and the eight-speed driven gear 54-8 are adjacent one another. The free gears are applied to the one-speed driven gear 54-1 and the two-speed driven gear 54-2, which are positioned at both ends of the arrangement. The slide gears are applied to the five-speed driven gear 54-5 and the six-speed driven gear 54-6, which are adjacent to the one-speed driven gear 54-1 and the two-speed driven gear 54-2 respectively.

Thus, on the counter shaft 51, types of the four drive gears disposed at a right side of the arrangement center C and types of the four drive gears disposed at a left side of the arrangement center C are symmetrical arrangements with respect to the arrangement center C. Similarly, on the drive shaft 52, types of the four driven gears disposed at the right side of the arrangement center C and types of the four driven gears disposed at the left side of the arrangement center C are symmetrical arrangements with respect to the arrangement center C.

The eight drive gears 53-1 to 53-8 are separate gears one another. Similarly, the eight driven gears 54-1 to 54-8 are also separate gears one another. That is, an integrated formation (a composite gear) of two or more gears adjacent in the axial direction is not applied to any of the eight drive gears 53-1 to 53-8 and the eight driven gears 54-1 to 54-8. Such configuration can facilitate production of the eight drive gears 53-1 to 53-8 and the eight driven gears 54-1 to 54-8. That is, when forming gear teeth, the integrated formation of two or more gears adjacent in the axial direction makes it difficult to sufficiently ensure an intersecting angle with a shaving cutter in order to avoid interference with the adjacent gears when forming gear teeth. This makes it difficult to ensure accuracy of tooth forms of the gears. In contrast, according to the embodiment, the eight drive gears 53-1 to 53-8 and the eight driven gears 54-1 to 54-8 are all separate, thus facilitating ensuring the accuracy of the tooth forms in production to facilitate the production.

FIG. 5 is a table that summarizes the arrangement of the eight shift-gear pairs 55-1 to 55-8 and the types of the drive gears 53-1 to 53-8 and the driven gears 54-1 to 54-8, which form the eight respective shift-gear pairs 55-1 to 55-8. "DISPOSITION" in the table indicates an order from the end of the arrangement of the shift-gear pairs 55-1 to 55-8. However, this order may be from any of the right end and the left end. Terms in parentheses of an item of the shift stage in the table indicate shift stages corresponding to the example illustrated in FIG. 4.

As illustrated in FIG. 5, the eight-speed shift-gear pair 55-8 having the smallest reduction gear ratio and the seven-speed shift-gear pair 55-7 having the second smallest reduction gear ratio are disposed as being adjacent one another at the center portion of the arrangement of the eight shift-gear pairs 55-1 to 55-8. The drive gears 53-8 and 53-7 and the driven gears 54-8 and 54-8 form these eight-speed shift-gear pair 55-8 and seven-speed shift-gear pair 55-7 respectively. The free gears are applied to the drive gears 53-8 and 53-7. The fixed gears are applied to the driven gears 54-8 and 54-7. The four-speed shift-gear pair 55-4 and the three-speed shift-gear pair 55-3, whose numbers of shift stages are different from those of the eight-speed shift-gear pair 55-8 and the seven-speed shift-gear pair 55-7 by four respectively, are disposed at the opposite sides (At the opposite sides of the arrangement center C. Third and sixth.) of the side where the eight-speed shift-gear pair 55-8 and the seven-speed shift-gear pair 55-7 are adjacent one another. The drive gears 53-4 and 53-3 and the driven gears 54-4 and 54-3 form the four-speed shift-gear pair 55-4 and the three-speed shift-gear pair 55-3 respectively. The slide gears are applied to the drive gears 53-4 and 53-3. The free gears are applied to the driven gears 54-4 and 54-3.

Each of the one-speed shift-gear pair 55-1 having the largest reduction gear ratio and the two-speed shift-gear pair 55-2 having the second largest reduction gear ratio is disposed on each of both ends (first and eighth) of the arrangement of the eight shift-gear pairs 55-1 to 55-8. The drive gears 53-1 and 53-2 and the driven gears 54-1 and 54-2 form the one-speed shift-gear pair 55-1 and the two-speed shift-gear pair 55-2 respectively. The fixed gears are applied to the drive gears 53-1 and 53-2. The free gears are applied to the driven gears 54-1 and 54-2. Each of the five-speed shift-gear pair 55-5 and the six-speed shift-gear pair 55-6, whose numbers of shift stages are different from those of the one-speed shift-gear pair 55-1 and the two-speed shift-gear pair 55-2 by four, is disposed at a position (second and seventh) adjacent to each of these one-speed shift-gear pair 55-1 and two-speed shift-gear pair 55-2. The drive gears 53-5 and 53-6 and the driven gears 54-5 and 54-6 form the five-speed shift-gear pair 55-5 and the six-speed shift-gear pair 55-6 respectively. The free gears are applied to the drive gears 53-5 and 53-6. The slide gears are applied to the driven gears 54-5 and 54-6.

Thus, the types of the eight drive gears 53-1 to 53-8 disposed on the counter shaft 51 are symmetric about the arrangement center C. For example, in the example illustrated in FIG. 5, from the arrangement center C to the right and left sides, the free gears (the fourth eight-speed drive gear 53-8 and the fifth seven-speed drive gear 53-7), the slide gears (the third four-speed drive gear 53-4 and the sixth three-speed drive gear 53-3), the free gears (the second five-speed drive gear 53-5 and the seventh six-speed drive gear 53-6), and the fixed gears (the first one-speed drive gear 53-1 and the eighth two-speed drive gear 53-2) are arranged in this order.

The types of the eight driven gears 54-1 to 54-8 disposed on the drive shaft 52, similar to those of the eight drive gears 53-1 to 53-8 disposed on the counter shaft 51, are also disposed as being arranged symmetrically with respect to the arrangement center C. For example, in the example illustrated in FIG. 5, from the center position of the arrangement of the eight driven gears 54-1 to 54-8 to the respective of right and left sides, the fixed gears (the fourth eight-speed driven gear 54-8 and the fifth seven-speed driven gear 54-7), the free gears (the third four-speed driven gear 54-4 and the sixth three-speed driven gear 54-3), the slide gears (the second five-speed driven gear 54-5 and the seventh six-speed driven gear 54-6), and the free gears (the first one-speed driven gear 54-1 and the eighth two-speed driven gear 54-2) are arranged in this order.

As illustrated in FIG. 5, the eight drive gears 53-1 to 53-8 and the eight driven gears 54-1 to 54-8 each include the two slide gears. The free gears are each adjacent to both sides in the axial direction of these slide gears. In the example (the parts in parentheses in FIG. 5) illustrated in FIG. 4, the three-speed drive gear 53-3 is the slide gear, and the six-speed drive gear 53-6 and the seven-speed drive gear 53-7, which are adjacent to the three-speed drive gear 53-3, are the free gears. The four-speed drive gear 53-4 is the slide gear, and the five-speed drive gear 53-5 and the eight-speed drive gear 53-8, which are adjacent to the four-speed drive gear 53-4, are the free gears. The five-speed driven gear 54-5 is the slide gear, and the one-speed driven gear 54-1 and the four-speed driven gear 54-4, which are adjacent to the five-speed driven gear 54-5, are the free gears. The six-speed driven gear 54-6 is the slide gear, and the two-speed driven gear 54-2 and the three-speed driven gear 54-3, which are adjacent to the six-speed driven gear 54-6, are the free gears.

Thus, the transmission mechanism 5 includes four sets of gears constituted of one slide gear and two free gears, which are adjacent to the slide gear. For convenience of explanation, "a set of gears constituted of one slide gear and two free gears, which are adjacent to the slide gear," is referred to as "a set of slide/free gears." In each of the four sets of slide/free gears, addendum circle diameters (outside diameters) of the two free gears are different one another, and an addendum circle diameter (an outside diameter) of the one slide gear is smaller than any of the addendum circle diameters (the outside diameters) of the two free gears. Thus, in each of the four sets, the one slide gear is disposed between the two free gears, whose addendum circle diameters are larger than that of the one slide gear. In each of the sets of slide/free gears, among differences of the numbers of shift stages between the one slide gear and the respective two free gears, the larger one (that is, the difference of the number of shift stages from the free gear having the large diameter) is four, which is one half of the total number of shift stages of the transmission mechanism 5.

In the example illustrated in FIG. 4, the four-speed drive gear 53-4, which is the slide gear, is adjacent to the five-speed drive gear 53-5 and the eight-speed drive gear 53-8, which are the free gears. The large difference of the number of shift stages is four, and the small difference of the number of shift stages is one. The three-speed drive gear 53-3, which is the slide gear, is adjacent to the six-speed drive gear 53-6 and the seven-speed drive gear 53-7, which are the free gears. The large difference of the number of shift stages is four, and the small difference of the number of shift stages is three. The five-speed driven gear 54-5, which is the slide gear, is adjacent to the one-speed driven gear 54-1 and the four-speed driven gear 54-4, which are the free gears. The large difference of the number of shift stages is four, and the small difference of the number of shift stages is one. The six-speed driven gear 54-6, which is the slide gear, is adjacent to the two-speed driven gear 54-2 and the three-speed driven gear 54-3, which are the free gears. The large difference of the number of shift stages is four, and the small difference of the number of shift stages is three.

The counter shaft 51 and the drive shaft 52 each include the two sets of slide/free gears. Addendum circle diameters of the two free gears in each set of the slide/free gears are different one another. Then, amplitude of the addendum circle diameters of the free gears in the two sets of slide/free gears disposed on each of the counter shaft 51 and the drive shaft 52 is symmetric about the arrangement center C.

Specifically, for both of the two sets of slide/free gears disposed on the counter shaft 51, the free gear having the large addendum circle diameter is disposed at a side close to the arrangement center C, and the free gear having the small addendum circle diameter is disposed at a side far from the arrangement center C. In the example illustrated in FIG. 4, the eight-speed drive gear 53-8, which is the free gear having the large diameter, is adjacent to the four-speed drive gear 53-4, which is the slide gear, at a side close to the arrangement center C, and the five-speed drive gear 53-5, which is the free gear having the small diameter, is adjacent to the four-speed drive gear 53-4 at a side far from the arrangement center C. The seven-speed drive gear 53-7, which is the free gear having the large diameter, is adjacent to the three-speed drive gear 53-3, which is the slide gear, at a side close to the arrangement center C, and the six-speed drive gear 53-6, which is the free gear having the small diameter, is adjacent to the three-speed drive gear 53-3 at a side far from the arrangement center C.

Similarly, for both of the two sets of slide/free gears disposed on the drive shaft 52, the free gear having the large addendum circle diameter is disposed at a side far from the arrangement center C, and the free gear having the small addendum circle diameter is disposed at a side close to the arrangement center C. In the example illustrated in FIG. 4, the one-speed driven gear 54-1, which is the free gear having the large diameter, is adjacent to the five-speed driven gear 54-5, which is the slide gear, at a side far from the arrangement center C, and the four-speed driven gear 54-4, which is the free gear having the small diameter, is adjacent to the five-speed driven gear 54-5 at a side close to the arrangement center C. The two-speed driven gear 54-2, which is the free gear having the large diameter, is adjacent to the six-speed driven gear 54-6, which is the slide gear, at a side far from the arrangement center C, and the three-speed driven gear 54-3, which is the free gear having the small diameter, is adjacent to the six-speed driven gear 54-6 at a side close to the arrangement center C.

Figure 6A:
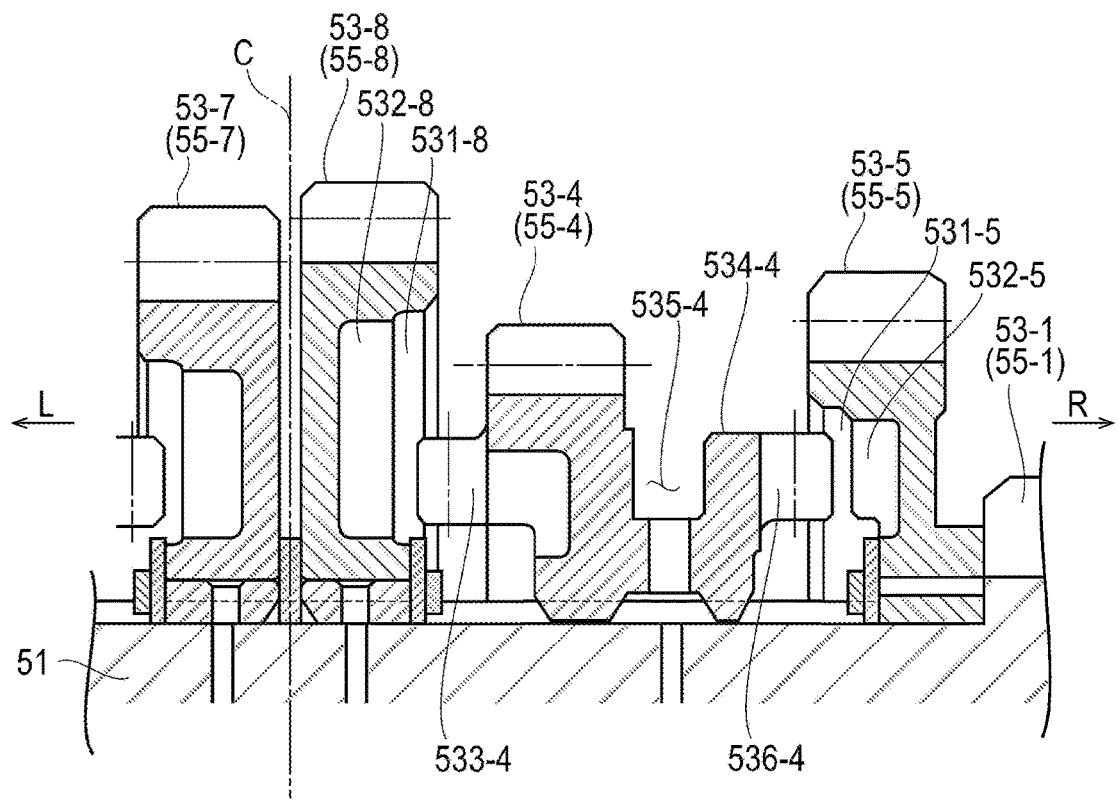
FIG. 6A is a cross-sectional view schematically illustrating an exemplary configuration of an exemplary set of slide/free gears.
Figure 6B:
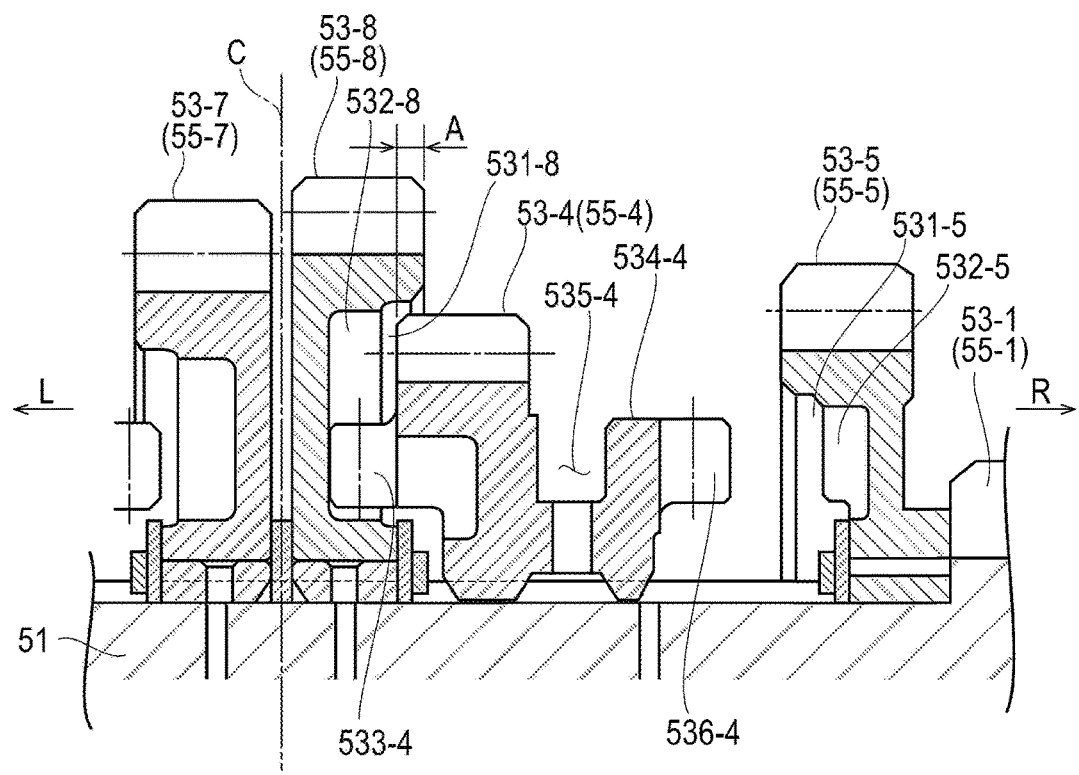
FIG. 6B is a cross-sectional view schematically illustrating an exemplary configuration of an exemplary set of slide/free gears.

The following describes an exemplary configuration of the set of slide/free gears with reference to FIG. 6A and FIG. 6B. FIG. 6A and FIG. 6B are cross-sectional views schematically illustrating an exemplary configuration of the set of the four-speed drive gear 53-4, which is the slide gear, and two free gears: the five-speed drive gear 53-5 and the eight-speed drive gear 53-8, which are adjacent to the four-speed drive gear 53-4, as an example of the set of slide/free gears.

As illustrated in FIG. 6A and FIG. 6B, the eight-speed drive gear 53-8 (the free gear) is adjacent to the tour-speed drive gear 53-4 (the slide gear) at the side close to the arrangement center C. The five-speed drive gear 53-5 (the free gear) is adjacent to the four-speed drive gear 53-4 at the side far from the arrangement center C.

The four-speed drive gear 53-4, which is the slide gear, has an addendum circle diameter smaller than addendum circle diameters of the five-speed drive gear 53-5 and the eight-speed drive gear 53-8, which are the two free gears adjacent to the four-speed drive gear 53-4. The addendum circle diameters of the five-speed drive gear 53-5 and the eight-speed drive gear 53-8 are different one another. In the combination illustrated in FIG. 6A and FIG. 6B, the eight-speed drive gear 53-8 has a diameter larger than that of the five-speed drive gear 53-5. Among end surfaces of the four-speed drive gear 53-4, on an end surface at the side close to the eight-speed drive gear 53-8, which is the free gear having the large diameter, a predetermined number of convex portions (male dogs) for coupling to the eight-speed drive gear 53-8 are disposed as being arranged in a circumferential direction. For convenience of explanation, these convex portions are referred to as main-body-portion-side convex portions 533-4. These main-body-portion-side convex portions 533-4 project to the side of the eight-speed drive gear 53-8 from an end surface of a part (what is called a rim) where the gear teeth are disposed.

The four-speed drive gear 53-4, which is the slide gear, includes an engagement groove 535-4 where the shift fork 57 is engaged. Specifically, among the end surfaces of the four-speed drive gear 53-4, on an end surface at the side close to the five-speed drive gear 53-5, which is the free gear having the small diameter, a cylindrically-shaped part (hereinafter referred to as "a tubular portion 534-4"), which projects to the side of the five-speed drive gear 53-5 from a part (a rim) where the gear teeth are disposed, is disposed. The toric engagement groove 535-4 is disposed on an outer periphery of this tubular portion 534-4. Thus, the tubular portion 534-4 projecting in the axial direction is disposed on the four-speed drive gear 53-4, which is the slide gear, at an opposite side of the side close to the eight-speed drive gear 53-8, which is the free gear having the large diameter. The engagement groove 535-4 where the shift fork 57 is engaged is disposed on this tubular portion 534-4. Then, a predetermined number of convex portions for coupling to the five-speed drive gear 53-5 are disposed as being arranged in a circumferential direction on the end surface (the end surface at the side close to the five-speed drive gear 53-5) of the tubular portion 534-4. For convenience of explanation, these convex portions disposed on the tubular portion 534-4 are referred to as tubular-portion-side convex portions 536-4.

A first hollow portion 531-8 and a predetermined number of second hollow portions 532-8 (female dogs) are disposed on an end surface (an end surface at a side close to the four-speed drive gear 53-4) at a side far from the arrangement center C of the eight-speed drive gear 53-8, which is the tree gear having the large diameter. The first hollow portion 531-8 is a part where an end portion in the axial direction of the part where the gear teeth of the four-speed drive gear 53-4 are disposed can be inserted. For example, a circular-shaped hollow portion, which has a diameter larger than the addendum circle diameter (the outside diameter) of the four-speed drive gear 53-4 and is coaxial to the counter shaft 51, viewed from the axial direction of the counter shaft 51, is applicable to the first hollow portion 531-8. The predetermined number of second hollow portions 532-8 (the female dogs), which are parts where the respective predetermined number of main-body-portion-side convex portions 533-4 (the male dogs) of the four-speed drive gear 53-4 can fit into, are disposed as being arranged in a circumferential direction.

FIG. 6B is a drawing illustrating a state where the four-speed drive gear 53-4 has moved to the eight-speed drive gear 53-8 side (the side close to the arrangement center C). As illustrated in FIG. 6B, if the four-speed drive gear 53-4 moves to the eight-speed drive gear 53-8 side, the end portion in the axial direction of the four-speed drive gear 53-4 gets into the first hollow portion 531-8 of the eight-speed drive gear 53-8. Furthermore, the main-body-portion-side convex portions 533-4 of the four-speed drive gear 53-4 get into the second hollow portions 532-8 of the eight-speed drive gear 53-8. In this state, from the side view (viewed from a direction perpendicular to the axial direction of the counter shaft 51), a part of the four-speed drive gear 53-4 and a part of the eight-speed drive gear 53-8 are superimposed one another. Especially, a part of the part where the gear teeth of the four-speed drive gear 53-4 are disposed is superimposed on the eight-speed drive gear 53-8. A part illustrated by reference numeral A in FIG. 6B is the part where the four-speed drive gear 53-4 and the eight-speed drive gear 53-8 are superimposed one another. Then, the main-body-portion-side convex portions 533-4 (the male dogs) of the four-speed drive gear 53-4 get into the second hollow portions 532-8 (the female dogs) of the eight-speed drive gear 53-8, thus making a state where the eight-speed drive gear 53-8 and the four-speed drive gear 53-4 are coupled together as integrally rotating.

A first hollow portion 531-5 and a predetermined number of second hollow portions 532-5 are disposed on an end surface (an end surface at a side close to the four-speed drive gear 53-4, which is the slide gear) at a side close to the arrangement center C of the five-speed drive gear 53-5, which is the free gear having the small diameter. The first hollow portion 531-5 is a part that can house an end portion in the axial direction of the tubular portion 534-4 of the four-speed drive gear 53-4. For example, a circular-shaped hollow portion, which has a diameter larger than an outside diameter of the tubular portion 534-4 of the four-speed drive gear 53-4 and is coaxial to the counter shaft 51, viewed from the axial direction of the counter shaft 51, is applicable to the first hollow portion 531-5. The predetermined number of second hollow portions 532-5 (the female dogs), which are parts where the respective predetermined number of tubular-portion-side convex portions 536-4 (the male dogs) of the four-speed drive gear 53-4 can fit into, are disposed as being arranged in a circumferential direction.

The four-speed drive gear 53-4 has moved to the five-speed drive gear 53-5 side (the side far from the arrangement center C), thus making a state where the end portion in the axial direction of the tubular portion 534-4 of the four-speed drive gear 53-4 has got into the first hollow portion 531-5 of the five-speed drive gear 53-5. This makes a state where the tubular-portion-side convex portions 536-4 of the four-speed drive gear 53-4 have got into the second hollow portions 532-5 of the five-speed drive gear 53-5. In this state, from the side view, a part of the tubular portion 534-4 of the four-speed drive gear 53-4 and a part of the five-speed drive gear 53-5 are superimposed one another. The tubular-portion-side convex portions 536-4 (the male dogs) of the four-speed drive gear 53-4 get into the second hollow portions 532-5 (the female dogs) of the five-speed drive gear 53-5, thus making a state where the five-speed drive gear 53-5 and the four-speed drive gear 53-4 are coupled together as integrally rotating.

Thus, the configuration where the first hollow portion 531-8 is disposed on the eight-speed drive gear 53-8 allows the eight-speed drive gear 53-8 and the four-speed drive gear 53-4 to be closely disposed in the axial direction. This ensures suppression of increasing in size in the axial direction of the transmission mechanism 5, or ensures reduction in size in the axial direction of the transmission mechanism 5. Similarly, the configuration where the first hollow portion 531-5 is disposed on the five-speed drive gear 53-5 allows the four-speed drive gear 53-4 and the five-speed drive gear 53-5 to be closely disposed.

The transmission mechanism 5 includes a set of three-speed/six-speed/seven-speed drive gears, a set of one-speed/four-speed/five-speed driven gears, and a set of two-speed/three-speed/six-speed driven gears, in addition to the above-described set of four-speed/five-speed/eight-speed drive gears, as the set of slide/free gears. The set of three-speed/six-speed/seven-speed drive gears, the set of one-speed/four-speed/five-speed driven gears, and the set of two-speed/three-speed/six-speed driven gears all have configurations similar to that of the above-described set of four-speed/five-speed/eight-speed drive gears.

Thus, in all the set of slide/free gears, the slide gear and the respective of two free gears, which are adjacent to the slide gear, are rotatably coupled together, such that the convex portions (the main-body-portion-side convex portions and the tubular-portion-side convex portions) of the slide gear get into the hollow portions (the second hollow portions) of the free gears. Then, the main-body-portion-side convex portions, which project in the axial direction from the end surface of the part (the rim) where the gear teeth are disposed is disposed on the slide gear. In contrast, the hollow portions (the first hollow portion and the second hollow portions), which are depressed from the end surface of the part (the rim) where the gear teeth are disposed, is disposed on the free gear. However, convex portions, which project from the end surface of the part where the gear teeth are disposed to the slide gear side, is not disposed on the free gear. Thus, the slide gear and the free gear do not have a configuration where the convex portions (the male dogs) are engaged one another. The slide gear and the free gear have a configuration where the convex portions (the male dogs) disposed on one hand is engaged with the hollow portions (the female dogs) disposed on the other hand. Then, a structure (the hollow portion) disposed on the free gear for coupling to the slide gear so as to ensure the transmission of the rotative power is disposed at a position that does not project to the slide gear side from the part where the gear teeth are disposed on the free gear. Such configuration ensures reduction of a distance in the axial direction between the slide gear and the free gear to reduce a dimension in the lateral direction of the transmission mechanism 5.

In the set of slide/free gears, the addendum circle diameter of the one slide gear is smaller than the addendum circle diameters of the two free gears. Then, the first hollow portion where the end portion in the axial direction of the one slide gear can fit into is disposed on the end surface of the side being opposed to the one slide gear, of the free gear having the large diameter among the two free gears. In the state where the one slide gear and the free gear having the large diameter are coupled together as integrally rotating, from the side view (viewed from the direction perpendicular to the axial direction), a part of the one slide gear and a part of the free gear having the large diameter are superimposed one another. Especially, the end portion in the axial direction of the part (what is called a rim) where the gear teeth are disposed, on the one slide gear, is superimposed on the free gear having the large diameter (the part illustrated by reference numeral A in FIG. 6B). Such configuration ensures reduction of a distance between the one slide gear and the free gear having the large diameter among the two free gears in each of the sets of slide/free gears.

In each of the four sets of slide/free gears, a difference in the number of shift stages between the slide gear and the free gear having the large diameter is four. This difference in the number of shift stages is one half of eight, which is the total number of shift stages of the transmission mechanism 5. In any set of slide/free gears, the difference in the number of shift stages between the slide gear and the free gear having the large diameter is larger than a difference in the number of shift stages between the slide gear and the free gear having the small diameter. Such configuration ensures increasing a difference in the addendum circle diameters between the slide gear and the free gear having the large diameter, thus ensuring the disposition of the first hollow portion where the slide gear can fit into the free gear having the large diameter, in all the sets of slide/free gears. Accordingly, this ensures the reduction in size of the transmission mechanism 5.

For the set of four-speed/five-speed/eight-speed drive gears and the set of three-speed/six-speed/seven-speed drive gears, which are disposed on the counter shaft 51, directions of the slide gear and the free gears, which are included in these sets, are symmetric about the arrangement center C. Specifically, the first hollow portion 531-8 and the second hollow portions 532-8 of the eight-speed drive gear 53-8, and a first hollow portion 531-7 and second hollow portions 532-7 of the seven-speed drive gear 53-7 are all disposed on end surfaces at sides far from the arrangement center C. The main-body-portion-side convex portions 533-4 of the four-speed drive gear 53-4 and main-body-portion-side convex portions 533-3 of the three-speed drive gear 53-3 are both disposed on end surfaces at sides close to the arrangement center C. The tubular portion 534-4 and the tubular-portion-side convex portions 536-4 of the four-speed drive gear 53-4, and a tubular portion 534-3 and tubular-portion-side convex portions 536-3 of the three-speed drive gear 53-3 are all disposed on end surfaces at sides far from the arrangement center C. The first hollow portion 531-5 and the second hollow portions 532-5 of the five-speed drive gear 53-5, and a first hollow portion 531-6 and second hollow portions 532-6 of the six-speed drive gear 53-6 are all disposed on end surfaces at sides close to the arrangement center C.

The same applies to the set of one-speed/four-speed/five-speed driven gears and the set of two-speed/three-speed/six-speed driven gears, which are disposed on the drive shaft 52. That is, a first hollow portion 541-1 and second hollow portions 542-1 of the one-speed driven gear 54-1, and a first hollow portion 541-2 and second hollow portions 542-2 of the two-speed driven gear 54-2 are all disposed on end surfaces at sides close to the arrangement center C. Main-body-portion-side convex portions 543-5 of the five-speed driven gear 54-5 and main-body-portion-side convex portions 543-6 of the six-speed driven gear 54-6 are both disposed on end surfaces at sides far from the arrangement center C. A tubular portion 544-5 and tubular-portion-side convex portions 546-5 of the five-speed driven gear 54-5, and a tubular portion 544-6 and tubular-portion-side convex portions 546-6 of the six-speed driven gear 54-6 are all disposed on end surfaces at sides close to the arrangement center C. A first hollow portion 541-4 and second hollow portions 542-4 of the four-speed driven gear 54-4, and a first hollow portion 541-3 and second hollow portions 542-3 of the three-speed driven gear 54-3 are all disposed on end surfaces at sides far from the arrangement center C.

Furthermore, disposition of the free gear having the large diameter and the free gear having the small diameter, which are included in the sets of slide/free gears are also symmetric about the arrangement center C. That is, for both of the set of four-speed/five-speed/eight-speed drive gears and the set of three-speed/six-speed/seven-speed drive gears, which are disposed on the counter shaft 51, the free gears (the eight-speed drive gear 53-8 and the seven-speed drive gear 53-7) having the large diameters are disposed at the sides close to the arrangement center C, and the free gears (the five-speed drive gear 53-5 and the six-speed drive gear 53-6) having the small diameters are disposed at the sides far from the arrangement center C. For both of the set of one-speed/four-speed/five-speed driven gears and the set of two-speed/three-speed/six-speed driven gears, which are disposed on the drive shaft 52, the free gears (the one-speed driven gear 54-1 and the two-speed driven gear 54-2) having the large diameters are disposed at the side far from the arrangement center C, and the free gears (the four-speed driven gear 54-4 and the three-speed driven gear 54-3) having the small diameters are disposed at the sides close to the arrangement center C.

The four free gears included in the eight drive gears 53-1 to 53-8 each have a configuration where the first hollow portion and the second hollow portions are disposed on one end surface in the axial direction. The two slide gears included in the eight drive gears 53-1 to 53-8 each have a configuration where the main-body-portion-side convex portions are disposed on one end surface, and the tubular portion and the tubular-portion-side convex portions are disposed on another end surface, in the axial direction. The hollow portion, the convex portion, and similar portion are not disposed on any of the two fixed gears included in the eight drive gears 53-1 to 53-8. The same applies to the eight driven gears 54-1 to 54-8. Thus, the embodiment has similar shapes (in other words, common shapes) by free gear, by slide gear, and by fixed gear. With such configuration, all the transmission gears (the drive gears and the driven gears) are separately formed as described above, and each transmission gear includes one series of gear teeth, thus facilitating processing of the gear teeth. Aligning the shape of each free gear such that only the hollow portions are disposed on only the one surface, and the convex portions are not disposed ensures communalization of processing operations and production facilities to improve productivity. Furthermore, each slide gear has the configuration where only the convex portions are disposed, and the hollow portions are not disposed, thus similarly ensuring the communalization of processing operations and production facilities to improve the productivity.

Figure 7:
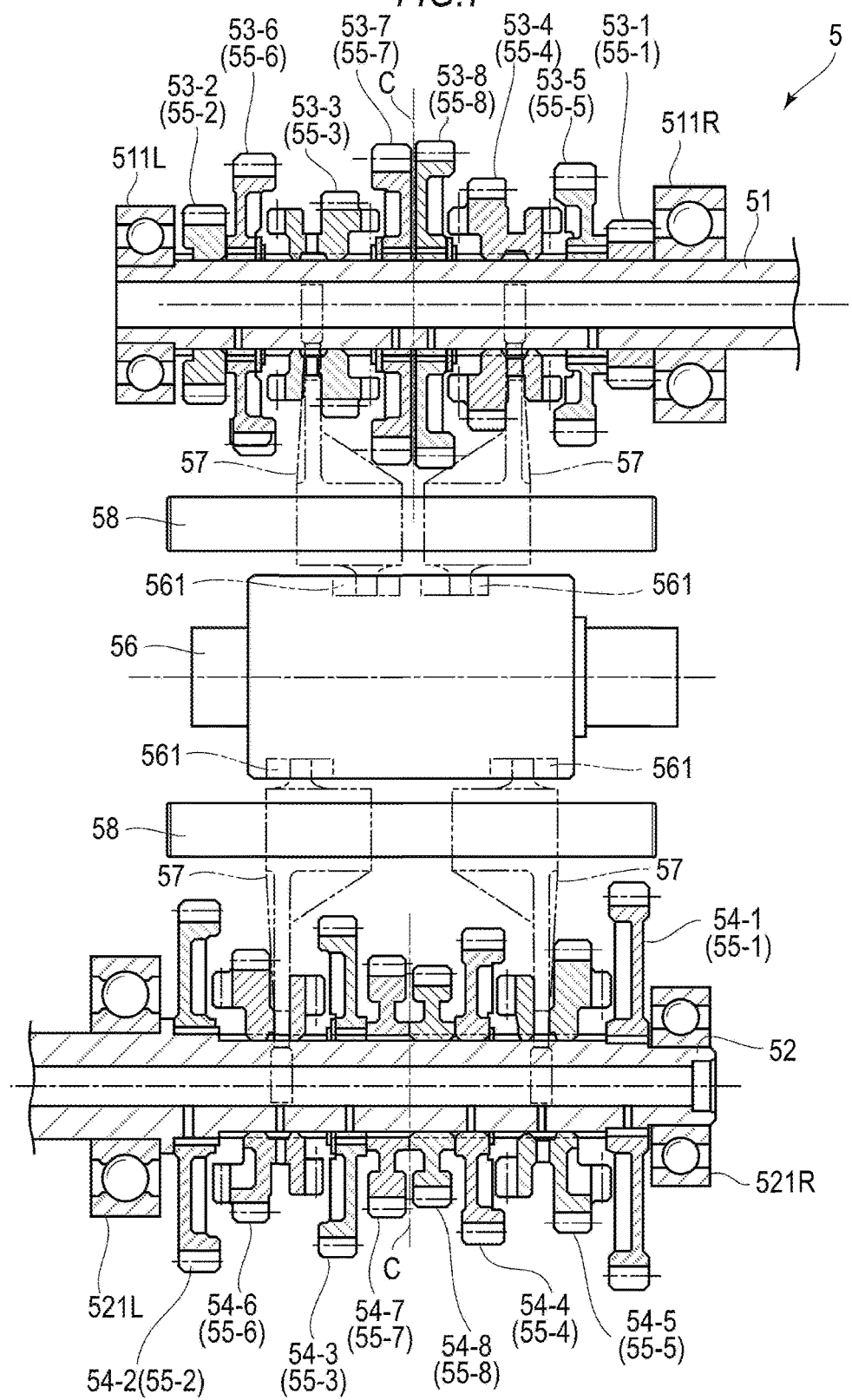
FIG. 7 is a cross-sectional view schematically illustrating an exemplary pairs of shift forks.

Here, an exemplary disposition of the shift forks 57 will be described with reference to FIG. 7. FIG. 7 is a cross-sectional view schematically illustrating the exemplary disposition of the shift forks 57. As illustrated in FIG. 7, the counter shaft 51 and the drive shaft 52 each include the two slide gears. Then, one shift fork guide 58 among the two shift fork guides 58 slidably and reciprocatably supports two shift forks 57, which each move each of the two slide gears (the three-speed drive gear 53-3 and the four-speed drive gear 53-4) disposed on the counter shaft 51. Similarly, another shift fork guide 58 among the two shift fork guides 58 slidably and reciprocatably supports two shift forks 57, which each move each of the two slide gears (the five-speed driven gear 54-5 and the six-speed driven gear 54-6) disposed on the drive shaft 52. Thus, the one shift fork guide 58 among the two shift fork guides 58 collectively supports the shift forks 57, which move the slide gears disposed on the counter shaft 51, and the other shift fork guide 58 collectively supports the shift forks 57, which move the slide gears disposed on the drive shaft 52.

Operation of Transmission Mechanism

The following describes an operation that the transmission mechanism 5 shifts gears. As illustrated in FIG. 7, the two shift fork guides 58 each reciprocatably support the two shift forks 57. The four cam grooves 561 are disposed on the shift cam 56. Then, each of the two shift forks 57, which are supported by the one shift fork guide 58, is engaged with each of the two slide gears, which are disposed on the counter shaft 51, and is engaged with each of the four cam grooves 561, which are disposed on the shift cam 56. Similarly, each of the two shift forks 57, which are supported by the other shift fork guide 58, is engaged with each of the two slide gears, which are disposed on the drive shaft 52, and is engaged with each of the four cam grooves 561, which are disposed on the shift cam 56. Then, corresponding to the rotation of the shift cam 56, each of the four shift forks 57 moves in the axial direction to move each of the four slide gears in the axial direction in an aspect described later. This switches (shifts gears) the shift stage (the shift position) of the transmission mechanism 5.

Neutral Position (Neutral)

A neutral position is in a state where all the four slide gears are not coupled to any of the two free gears, which are adjacent to any of the four slide gears, so as to transmit the rotative power. Specifically, the neutral position is in a state where the three-speed drive gear 53-3 is not coupled to any of the six-speed drive gear 53-6 and the seven-speed drive gear 53-7, the four-speed drive gear 53-4 is not coupled to any of the five-speed drive gear 53-5 and the eight-speed drive gear 53-8, the six-speed driven gear 54-6 is not coupled to any of the two-speed driven gear 54-2 and the three-speed driven gear 54-3, and the five-speed driven gear 54-5 is not coupled to any of the four-speed driven gear 54-4 and the one-speed driven gear 54-1.

In this state, rotation of the four-speed drive gear 53-4, which is the slide gear, is not transmitted to any of the eight-speed drive gear 53-8 and the five-speed drive gear 53-5, which are the free gears adjacent to the four-speed drive gear 53-4. Similarly, rotation of the three-speed drive gear 53-3, which is the slide gear, is not transmitted to any of the seven-speed drive gear 53-7 and the six-speed drive gear 53-6, which are the free gears adjacent to the three-speed drive gear 53-3. In view of this, the rotative power of the counter shaft 51 is not transmitted to the drive shaft 52 via the five-speed/six-speed/seven-speed/eight-speed shift-gear pairs 55-5 to 55-8.

The five-speed driven gear 54-5, which is the slide gear, is not coupled to any of the one-speed driven gear 54-1 and the four-speed driven gear 54-4, which are adjacent to the five-speed driven gear 54-5, thus the one-speed driven gear 54-1 and the four-speed driven gear 54-4 are in states that are rotatable relative to the drive shaft 52. Similarly, the six-speed driven gear 54-6, which is the slide gear, is not coupled to any of the two-speed driven gear 54-2 and the three-speed driven gear 54-3, which are adjacent to the six-speed driven gear 54-6, thus the two-speed driven gear 54-2 and the three-speed driven gear 54-3 are both in states that are rotatable relative to the drive shaft 52. In view of this, the rotative power is not transmitted to the drive shaft 52 via the one-speed/two-speed/three-speed/four-speed shift-gear pairs 55-1 to 55-4. Accordingly, when the shift position is at the neutral position, the rotative power of the counter shaft 51 is not transmitted to the drive shaft 52.

One-Speed

The five-speed driven gear 54-5 is moved from the neutral position to a side of the one-speed driven gear 54-1 to switch to a state where the five-speed driven gear 54-5 is coupled to the one-speed driven gear 54-1. This state is one-speed. In this state, the one-speed driven gear 54-1 and the five-speed driven gear 54-5 integrally rotate. In view of this, the rotative power of the countershaft 51 is transmitted to the drive shaft 52 via the one-speed shift-gear pair 55-1 (the one-speed drive gear 53-1 and the one-speed driven gear 54-1) and the five-speed driven gear 54-5.

Two-Speed

The five-speed driven gear 54-5 is moved from the state at one-speed to a position that is not coupled to any of the one-speed and four-speed driven gears 54-1 and 54-4. In this state, the coupling between the one-speed driven gear 54-1 and the five-speed driven gear 54-5 has been released, and the one-speed driven gear 54-1 is in a rotatable state with respect to the drive shaft 52 to be in the state at the neutral position. The six-speed driven gear 54-6 is moved from this neutral position to a side of the two-speed driven gear 54-2 to switch to a state where the six-speed driven gear 54-6 is coupled to the two-speed driven gear 54-2. This state is two-speed. In this state, the two-speed driven gear 54-2 and the six-speed driven gear 54-6 integrally rotate. In view of this, the rotative power of the counter shaft 51 is transmitted to the drive shaft 52 via the two-speed shift-gear pair 55-2 (the two-speed drive gear 53-2 and the two-speed driven gear 54-2) and the six-speed driven gear 54-6.

Three-Speed

The six-speed driven gear 54-6 is moved from the state at two-speed to a side of the three-speed driven gear 54-3 to switch to a state where the six-speed driven gear 54-6 is coupled to the three-speed driven gear 54-3. This state is three-speed. In this state, the coupling between the two-speed driven gear 54-2 and the six-speed driven gear 54-6 has been released, and the two-speed driven gear 54-2 is in a rotatable state with respect to the drive shaft 52. The three-speed driven gear 54-3 integrally rotates with the six-speed driven gear 54-6. In view of this, the rotative power of the counter shaft 51 is transmitted to the drive shaft 52 via the three-speed shift-gear pair 55-3 (the three-speed drive gear 53-3 and the three-speed driven gear 54-3) and the six-speed driven gear 54-6.

Four-Speed

The six-speed driven gear 54-6 is moved from the state at three-speed to a position that is not coupled to any of the three-speed driven gear 54-3 and the two-speed driven gear 54-2. The five-speed driven gear 54-5 is moved to a side of the four-speed driven gear 54-4 to switch to a state where the five-speed driven gear 54-5 is coupled to the four-speed driven gear 54-4. This state is four-speed. In this state, the two-speed driven gear 54-2 and the three-speed driven gear 54-3 both are in rotatable states with respect to the drive shaft 52. In view of this, the rotative power of the counter shaft 51 is not transmitted to the drive shaft 52 via the two-speed shift-gear pair 55-2 and the three-speed shift-gear pair 55-3. On the other hand, the four-speed driven gear 54-4 is in a state that integrally rotates with the five-speed driven gear 54-5. In view of this, the rotative power of the counter shaft 51 is transmitted to the drive shaft 52 via the four-speed shift-gear pair 55-4 (the four-speed drive gear 53-4 and the four-speed driven gear 54-4) and the five-speed driven gear 54-5.

Five-Speed

The five-speed driven gear 54-5 is moved from the state at four-speed to the position that is not coupled to any of the one-speed and four-speed driven gears 54-1 and 54-4. The four-speed drive gear 53-4 is moved to the five-speed drive gear 53-5 side to switch to a state where the four-speed drive gear 53-4 is coupled to the five-speed drive gear 53-5. This state is five-speed. In this state, the four-speed driven gear 54-4 is in a rotatable state relative to the drive shaft 52, and the five-speed drive gear 53-5 is in a state that integrally rotates with the four-speed drive gear 53-4. In view of this, the rotative power of the counter shaft 51 is transmitted to the drive shaft 52 via the four-speed drive gear 53-4 and the five-speed shift-gear pair 55-5 (the five-speed drive gear 53-5 and the five-speed driven gear 54-5).

Six-Speed

The four-speed drive gear 53-4 is moved from the state at five-speed to a position that is not coupled to any of the five-speed drive gear 53-5 and the eight-speed drive gear 53-8. The three-speed drive gear 53-3 is moved to a side of the six-speed drive gear 53-6 to be coupled to switch to a state where the three-speed drive gear 53-3 is coupled to the six-speed drive gear 53-6. This state is six-speed. In this state, the five-speed drive gear 53-5 is in a rotatable state relative to the counter shaft 51, and the six-speed drive gear 53-6 is in a state that integrally rotates with the three-speed drive gear 53-3. In view of this, the rotative power of the counter shaft 51 is transmitted to the drive shaft 52 via the three-speed drive gear 53-3 and the six-speed shift-gear pair 55-6 (the six-speed drive gear 53-6 and the six-speed driven gear 54-6).

Seven-Speed

The three-speed drive gear 53-3 is moved from the state at six-speed to a side of the seven-speed drive gear 53-7 to switch to a state where the three-speed drive gear 53-3 is coupled to the seven-speed drive gear 53-7. This state is seven-speed. In this state, the six-speed drive gear 53-6 is in a rotatable state relative to the counter shaft 51, and the seven-speed drive gear 53-7 is in a state that integrally rotates with the three-speed drive gear 53-3. In view of this, the rotative power of the counter shaft 51 is transmitted to the drive shaft 52 via the three-speed drive gear 53-3 and the seven-speed shift-gear pair 55-7 (the seven-speed drive gear 53-7 and the seven-speed driven gear 54-7).

Eight-Speed

The three-speed drive gear 53-3 is moved from the state at seven-speed to a position that is not coupled to any of the six-speed drive gear 53-6 and the seven-speed drive gear 53-7. The four-speed drive gear 53-4 is moved to the eight-speed drive gear 53-8 side to switch to a state where the four-speed drive gear 53-4 is coupled to the eight-speed drive gear 53-8. This state is eight-speed. In this state, the six-speed drive gear 53-6 and the seven-speed drive gear 53-7 both are in rotatable states relative to the counter shaft 51. The eight-speed drive gear 53-8 is in a state that integrally rotates with the four-speed drive gear 53-4. In view of this, the rotative power of the counter shaft 51 is transmitted to the drive shaft 52 via the four-speed drive gear 53-4 and the eight-speed shift-gear pair 55-8 (the eight-speed drive gear 53-8 and the eight-speed driven gear 54-8).

As described above, rotating the shift cam 56 moves each of the four slide gears as described above to ensure the switch (the shift of the gear) of the shift stage (the shift position).

As described above, the embodiment of the present invention has been described in detail with reference to the drawings. However, the above-described embodiment merely indicates a concrete example for exploitation of the present invention. The technical scope of the present invention is not limited to the above-described embodiment. Various modifications of the present invention can be made without departing from its spirit, such modifications being included within the technical scope of this invention.

For example, the above-described embodiment has indicated an example where the transmission mechanism of the present invention is applied to the engine unit of the motorcycle. However, the present invention is not limited to such configuration. The present invention is also applicable to engine units of various saddle-ride type vehicles such as a three-wheeled vehicle and a four-wheeled vehicle, and various vehicles other than the saddle-ride type vehicle, in addition to the motorcycle. The above-described embodiment has indicated the engine unit where the transmission mechanism of the present invention is integrally attached with the driving force source (the engine portion). However, the present invention is not limited to such configuration. The transmission mechanism of the present invention is also applicable to a transmission independent from the driving force source. The present invention is applicable to the transmission mechanism insofar as it is a constant-mesh type transmission mechanism.

The present invention is a technique effective for a constant-mesh type transmission mechanism. Then, the present invention ensures the further multistage while suppressing the deformation of the counter shaft and the drive shaft.

The present invention ensures the further multistage while suppressing the deformation of the counter shaft and the drive shaft.

What is claimed is:

1. A transmission mechanism comprising:
an input shaft to which a rotative power is transmitted;
a plurality of drive gears arranged in an axial direction on the input shaft, wherein:
the plurality of drive gears comprise slide gears reciprocatable in the axial direction of the input shaft, and free gears disposed adjacent to the slide gears in the axial direction of the input shaft and rotatable relative to the input shaft, and
convex portions projecting from end surfaces in the axial direction of teeth are disposed on ones of the slide gears and the free gears included in the plurality of drive gears and adjacent to one another, hollow portions depressing from end surfaces in the axial direction of teeth are disposed on others, and the convex portions are fitted into the hollow portions to couple the slide gears and the free gears included in the plurality of drive gears and adjacent one another so as to ensure the transmission of the rotative power;
an output shaft that outputs a rotative power outside; and
a plurality of driven gears arranged in an axial direction on the output shaft, wherein:
the plurality of driven gears comprise slide gears reciprocatable in the axial direction of the output shaft, and free gears disposed adjacent to the slide gears in the axial direction of the output shaft and rotatable relative to the output shaft,
convex portions projection from end surfaces in the axial direction of teeth are disposed on ones of the slide gears and the free gears included in the plurality of driven gears and adjacent one another, hollow portions depressing from end surfaces in the axial direction of teeth are disposed on others, and the convex portions are fitted into the hollow portions to couple the slide gears and the free gears included in the plurality of driven gears and adjacent one another so as to ensure the transmission of the rotative power,
each of the plurality of drive gears is engaged with each of the plurality of driven gears so as to ensure transmission of the rotative power to form a plurality of shift-gear pairs, the plurality of shift-gear pairs having mutually different reduction gear ratios,
a first drive gear included in a first shift-gear pair and a second drive gear included in a second shift-gear pair are adjacent one another at a center portion of an arrangement of the plurality of drive gears, the first shift-gear pair having a smallest reduction gear ratio among the plurality of shift-gear pairs, and the second shift-gear pair having a small reduction gear ratio next to the first shift-gear pair, and
a first driven gear included in the first shift-gear pair and a second driven gear included in the second shift-gear pair are adjacent one another at a center portion of an arrangement of the plurality of driven gears.

2. The transmission mechanism according to claim 1, wherein:

each of the plurality of slide gears included in the plurality of drive gears and the plurality of driven gears is adjacent to two free gears having mutually different outside diameters among the plurality of free gears, a hollow portion is disposed on a free gear having a large diameter of the two free gears, the hollow portion ensuring insert of an end portion in an axial direction of the slide gear adjacent to the free gear having the large diameter and when the free gear having the large diameter is coupled to the slide gear adjacent to the free gear having the large diameter so as to ensure the transmission of the rotative power, a part of the free gear having the large diameter is superimposed on a part of the slide gear adjacent to the free gear having the large diameter, viewed from a direction perpendicular to a rotational center line.

3. The transmission mechanism according to claim 2, wherein differences of counts of shift stages of the free gears having the large diameters and counts of shift stages of the slide gears adjacent to the free gears having the large diameter are all identical.

4. The transmission mechanism according to claim 1, wherein:

the plurality of drive gears further include a plurality of fixed gears that are nonmovable in the axial direction with respect to the input shaft and integrally rotate with the input shaft, and the free gears, the slide gears, and the fixed gears included in the plurality of drive gears are symmetrically disposed about a center of the arrangement of the plurality of drive gears.

5. The transmission mechanism according to claim 1, wherein:

the plurality of driven gears further include a plurality of fixed gears that are nonmovable in the axial direction with respect to the output shaft and integrally rotate with the output shaft, and the free gears, the slide gears, and the fixed gears included in the plurality of driven gears are symmetrically disposed about a center of the arrangement of the plurality of driven gears.

* * * * *

UNITED STATES PATENT AND TRADEMARK OFFICE
CERTIFICATE OF CORRECTION

PATENT NO. : 10,428,906 B2
APPLICATION NO. : 15/411146
DATED : October 1, 2019
INVENTOR(S) : Hideaki Takahashi Page 1 of 1

It is certified that error appears in the above-identified patent and that said Letters Patent is hereby corrected as shown below:

In the Claims

Column (24); Line (43) correct the term "projection" to "projecting"

Signed and Sealed this
Eighteenth Day of February, 2020

Andrei Iancu
*Director of the United States Patent and Trademark Office*